US006175831B1

(12) United States Patent
Weinreich et al.

(10) Patent No.: US 6,175,831 B1
(45) Date of Patent: Jan. 16, 2001

(54) METHOD AND APPARATUS FOR CONSTRUCTING A NETWORKING DATABASE AND SYSTEM

(75) Inventors: Andrew P. Weinreich; Mark R. Salamon; Shoshana Zilberberg; Nicole D. Berlyn; Leeann Mitchell; Cliff Rosen; Adam Seifer; Justin Green, all of New York; David Haber, Great Neck; David Samuels, Atlantic Beach; Ron Chibnik, New York; Scott Clifford, East Moriches, all of NY (US); Chandrasekhar Boddu, Piscataway, NJ (US)

(73) Assignee: six degrees, inc., New York, NY (US)

( * ) Notice: Under 35 U.S.C. 154(b), the term of this patent shall be extended for 0 days.

(21) Appl. No.: 08/785,559

(22) Filed: Jan. 17, 1997

(51) Int. Cl.[7] .................................................. G06F 17/30
(52) U.S. Cl. ............................. 707/10; 707/130; 707/104; 345/333; 364/918
(58) Field of Search ............................. 707/130, 10, 104, 707/511; 395/200; 370/407; 706/47, 60; 345/333; 358/402, 440, 444; 705/14; 434/350; 364/918

(56) References Cited

U.S. PATENT DOCUMENTS

| | | | |
|---|---|---|---|
| 5,008,853 | * | 4/1991 | Bly et al. ............................... 364/228 |
| 5,220,657 | * | 6/1993 | Bly et al. ............................... 364/228 |
| 5,632,018 | * | 5/1997 | Otorii ..................................... 395/200 |
| 5,754,938 | * | 5/1998 | Herz et al. ................................ 455/2 |
| 5,781,901 | * | 7/1998 | Kuzma ..................................... 707/10 |
| 5,790,790 | * | 8/1998 | Smith et al. ............................ 395/200 |
| 5,794,210 | * | 8/1998 | Goldhaber et al. ...................... 705/14 |
| 5,809,242 | * | 9/1998 | Shaw et al. ............................ 395/200 |
| 5,822,523 | * | 10/1998 | Rothschild et al. .................... 395/200 |
| 5,826,269 | * | 10/1998 | Hussey ..................................... 707/10 |

OTHER PUBLICATIONS

G. Welz—The Ad Game—Internet World Magazine vol. 7 No. 8, (c) 1996 Mecklermedia Corporation (8 pp).
L. Napoli—Enough Already! Girls' Science Project Opens E–Mail Floodgates—May 1, 1996 (2 pp).
Pages from The Great Providence Brewing Co. Website—Aug. 7, 1996 (3 pp).
W. S. Mossberg—Some Firms Offer Free E–Mail, But There's A Price To Pay—Aug. 1, 1996 (The Wall Street Journal Interactive Edition) (3 pp).
S. Elliott—Ad–Supported E–Mail Service Opens For Business—Apr. 22, 1996 (The New York Times "CyberTimes") (2 pp).

* cited by examiner

Primary Examiner—Wayne Amsbury
Assistant Examiner—Thu-Thao Havan
(74) Attorney, Agent, or Firm—Pennie & Edmonds LLP

(57) ABSTRACT

A networking database containing a plurality of records for different individuals in which individuals are connected to one another in the database by defined relationships. Each individual has the opportunity to define the relationship which may be confirmed or denied. E-mail messaging and interactive communication between individuals and a database service provider provide a method of constructing the database. The method includes having a registered individual identify further individuals and define therewith a relationship. The further individuals then, in turn, establish their own defined relationships with still other individuals. The defined relationships are mutually defined.

36 Claims, 33 Drawing Sheets

[H.SERVC.PROVFILE.HOME.1]

Page welcomes member and displays entire profile as listed and gives options to edit Welcome FN LN
Member since x/xx/xx
You last visited
You last updated PP

| | |
|---|---|
| Name, aliases | EDIT |
| Gender | EDIT |
| Email address | EDIT |
| Password - type below | submit |
| Geography | EDIT |
| Occupation | EDIT |
| Hobby | EDIT |
| Skills | EDIT |
| White Pages Listing<br>    Name<br>    Email<br>    Address<br>    Phone | EDIT |
| Update contacts<br>(Relationship manager) | EDIT |
| Cancel Membership | EDIT |

Fig. 11

METHOD AND APPARATUS FOR CONSTRUCTING A NETWORKING DATABASE AND SYSTEM

MICROFICHE APPENDIX

A Microfiche Appendix containing computer source code is attached. The Microfiche Appendix comprises 7 sheets of microfiche having 607 frames, including one title frame.

The Microfiche Appendix contains material which is subject to copyright protection. The copyright owner has no objection to the reproduction of such material, as it appears in the files of the Patent and Trademark Office, but otherwise reserves all copyright rights whatsoever.

1. Field of the Invention

The present invention is directed to a networking database having a plurality of records corresponding to individuals, more particularly to a networking database in which the records of registered individuals are linked by defined relationships to a record of one or more other individuals.

2. Background of the Invention

The concept of networking, that is, expanding one's knowledge of other people for a personal or professional advantage, is as old as politics. The advance of technology has made it easier for a person to contact another, but it still requires person-to-person contact.

With the remarkable spread of the Internet and the World Wide Web ("the Web") (collectively, the "Internet"), in recent years, electronic mail, or e-mail systems, have become well-known to the public. E-mail systems are used to transmit information among users, wherein each "user" is identified by a unique e-mail address.

Commonly, an e-mail address is assigned to each employee of large corporations or organizations for communication with colleagues or clients, as well as for internal communications between co-workers. The same is true of universities which often assign an e-mail address to each of their students, professors, and staff. Outside of these relationships, one may also obtain an e-mail address using on-line services, such as America Online and CompuServe, or more specialized e-mail providers, such as MCI Mail, and other Internet-access providers. Needless to say, to communicate by e-mail, one generally must first know the intended recipient's address. E-mail address directories may or may not be available to the general public.

Obtaining e-mail service from a private company is often expensive and, in many cases, the services provided are more expansive than a customer would like to endure. Thus, the service can be cumbersome and hard to comprehend for the user.

Recently, however, some firms have started e-mail systems that are free to consumers. For example, Juno Online Services offers an e-mail service wherein a user is assigned an e-mail address in exchange for a profile describing themselves and their tastes. The Juno system provides software that is loaded onto the hard drive of the user's computer system to be used and provides the user with the ability to read incoming e-mail messages and send e-mail messages. The Juno system, however, does not allow the user to send or receive attachments such as computer records containing graphics or spreadsheets along with an incoming or outgoing e-mail message. Moreover, Juno, in exchange for using the system, sends advertisements to the user based upon the personal information requested, which includes hobbies, traits, education, occupation, etc. This potentially becomes a significant nuisance. In addition, the system is generally slower than other systems because of the added text from the advertisements. This is problematic, especially, when the user is anxiously awaiting an e-mail message.

These e-mail systems are useful for e-mail advertising and marketing. They generate money based on subscription cost or by advertising to the user. However, they are otherwise limited in their usefulness to the users of the system.

OBJECT AND SUMMARY OF THE INVENTION

As realized by the present applicants, these prior art systems do not provide any mechanism whereby one user can take advantage of the database comprised of the authorized users of e-mail systems for personal and/or professional gain. As also realized by the inventors, if an individual can register with the database, for example, by providing professional and personal data, and perhaps other selected criteria common to all (or significant numbers of the users), the user consequently can be linked to a plurality of other such individuals who have similarly provided information based on defined linking relationships.

It is, therefore, an object of the present invention to provide a networking database in which a plurality of individuals register and become respectively linked with one or more other registered individuals by defined relationships.

It is another object to provide a method of constructing such a networking database.

It is yet another object to allow a user to perform a search using the database and the defined relationships in order to determine specific information about a registered user.

The present invention is thus broadly directed to a networking database and a method of constructing a networking database. The invention also relates to applications of the networking database in commercial enterprise.

In one embodiment, the method of the present invention is directed to constructing a networking database by having a first user sponsor a second user using a first defined relationship, wherein the second user confirms the sponsored defined relationship, and in turn, sponsors a third user using a first (or a different) defined relationship. The confirmation of a defined relationship and the sponsoring of the third user renders the second user a member of the database. The third user, upon sponsoring a fourth user and confirming the proposed defined relationship with the second user, also is in the database. Thus, a link is established between the first and fourth users, who it is assumed do not know each other, through the second and third users, through a chain of three defined relationships. In this manner, by each sponsored user confirming the original sponsored defined relationship and in turn sponsoring one or more other users, the database grows in size, arithmetically, geometrically, or exponentially as the case may be.

In a preferred embodiment, the method of constructing the database concerns issuing an e-mail from a database service provider to a first individual. The individual is invited to respond to the delivered e-mail by providing selected information. The selected information includes, for example, a name and an e-mail address of a second individual that the first individual proposes to sponsor for membership in the database, a description of a relationship between the first individual and the second individual, and perhaps selected information about the first individual. The first individual preferably returns the selected information by e-mail to the database service provider. The database service provider scans the incoming e-mail from the first individual, extracts from the e-mail message the information concerning the second individual, and then generates and transmits to the second individual an e-mail message inviting the second individual to join the database.

The second individual is thus invited to respond by providing information about a third individual, and perhaps by providing selected information regarding the second individual. The information about the third individual includes, a description of a relationship between the second individual and the third individual, for example, the name and an e-mail address, and perhaps other information. In the case of a second individual, the second individual is also invited to confirm the relationship between the first individual and the second individual. The second individual may confirm or deny the relationship with the first individual. In addition perhaps, the second individual may modify the relationship type as proposed by the first individual.

In the case that the second individual confirms the relationship with the first individual, this confirmation creates a defined relationship between the first and second individuals. This information is stored in the database, in records respectively associated with the first and second individuals. Similarly, if the third individual confirms or denies a relationship with the second individual, this information also is stored in the relationship database. In the event that each individual has at least one defined relationship, that individual becomes a pre-registered member of the database. A pre-registered member who completes all of the other membership requirements (see FIGS. 4A–4C) is known as an "active" member. Importantly, in this embodiment, the messaging is entirely electronic, that is, by e-mail. It is, thus, automatic and a database can be quickly constructed.

In the foregoing manner, numerous individuals can become members of the database, each member having a defined relationship to at least one other member in the database which is a confirmed relationship of one sort or another.

In addition to the e-mail communication system for joining the database, individuals also may be able to join the database by accessing a Web-site of the database service provider on the Internet. This is done in a conventional manner by accessing the Web-site through an Internet service provider. Once the user has logged into the Web-site, he can input certain information and sponsor other individuals to become members, thereby beginning the registration process. Each individual who is a pre-registered member will have the opportunity to provide additional information regarding personal characteristics. This information also becomes part of the database associated with the individual. This information is preferably input, and thus can be edited, via the Web site of the database service provider.

The first individual sponsoring a second individual, via the Web-site, causes an e-mail message to be automatically generated and delivered to the second individual. This e-mail message prompts the second individual to respond by e-mail in the manner as previously described. The second individual may respond by e-mail as previously described, or alternatively, may access the Web-site to find out more information regarding the database service provider, and proceed with the registration process through the Web-site instead of the e-mail communications technique.

In this way, the database can become constructed automatically, based on information which is entered electronically. Moreover, the growth of the database can become exponential as more and more members sign up additional members who in turn sign up an additional number of members. Thus, it is not inconceivable that the database can contain hundreds of thousands, if not millions, of individuals, each having a record in a database, in which the individual provides selected personal information. The files are password protected for security and privacy reasons.

The database, thus constructed, contains defined relationships between different pairs (or groups) of individuals. As noted, these pairs of individuals can be linked or interconnected by chains of defined relationships so that one individual can access the database and, through one or more defined relationships, locate another individual who is also a member of the database by some characteristic, that is information that was input into the database. Although the searching individual may not personally know the individual who is the object of the search, the searching individual has a defined relationship with someone, who has a defined relationship with someone, who has a defined relationship with someone, etc., and finally the object individual can be connected through this networking to the searching individual.

As appreciated by the inventors, the basic concept of the networking database, having defined relationships between individuals, is a unique application of the theory that everyone is linked to everyone else on the planet through a maximum of six defined relationships.

Although the principal invention concerns the use of e-mail and the Internet based on ease of communications and automatic processing, it should be understood that alternate messaging forms could be used, for example, telephone numbers whereby information could be input by touchtone keypads.

The networking database of the present invention has applications for searching in terms of finding other individuals in the database, finding a connection to other users in the database, and finding other individuals in the database having particular professional or personal characteristics or features that are of interest to another member.

BRIEF DESCRIPTION OF THE DRAWINGS

Further features of the invention, its nature, and various advantages will be more apparent from the accompanying drawings, and the following detailed description in which like reference numerals refer to like elements and in which:

FIG. 11 is an illustration of the personal profile edit screen of the present invention;

DETAILED DESCRIPTION OF THE DRAWINGS

Figure 1:
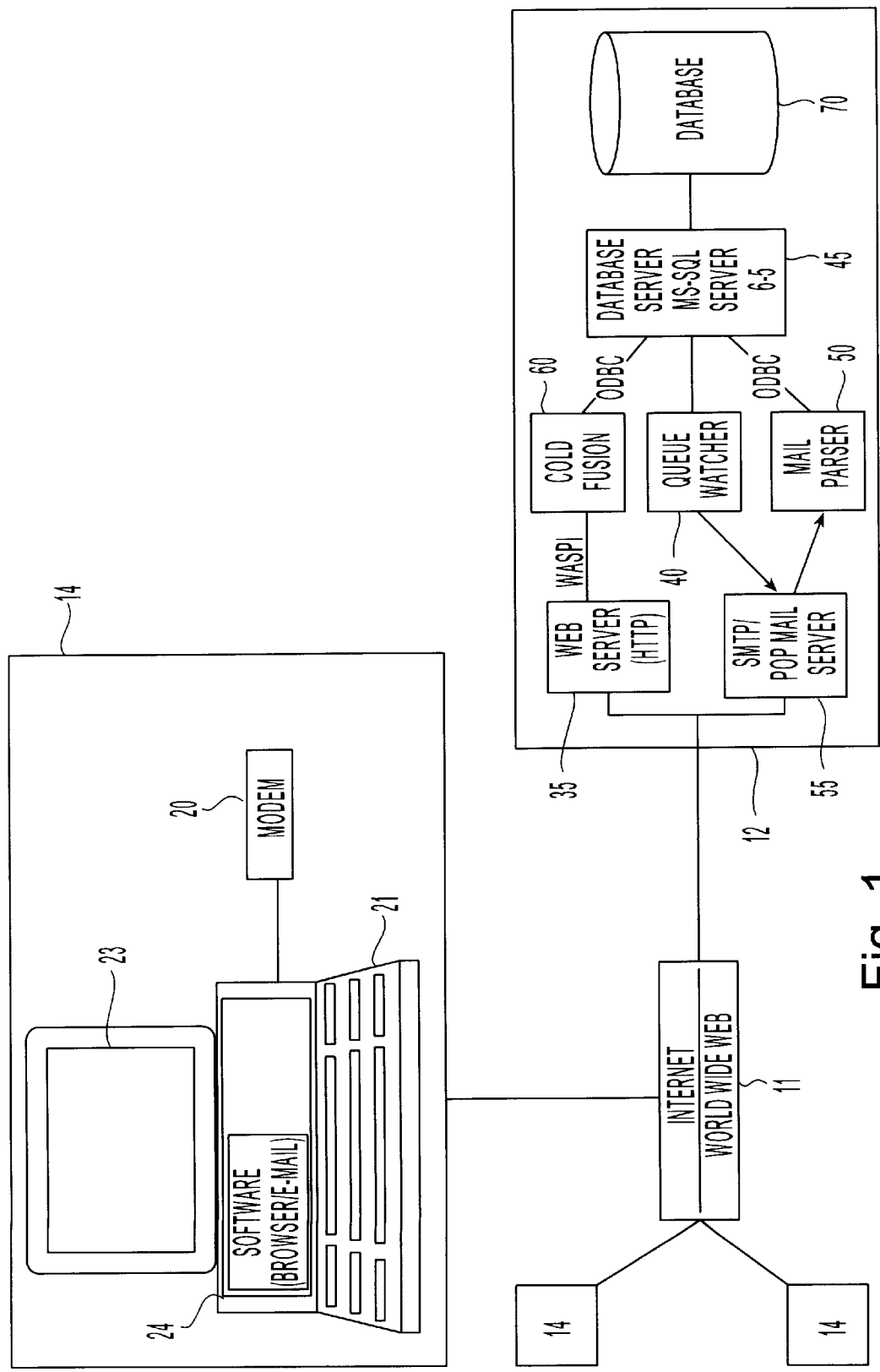
FIG. 1 is a block diagram of a networking database system (NDS) in accordance with a preferred embodiment of the present invention.

Referring to FIG. 1, there is generally shown a networking database system (NDS) 10 in accordance with the present invention. The NDS 10 includes a plurality of computers 14, each of which is coupled to a network 11, and, in turn, to a database service provider (DSP) 12. Each computer 14, of which one is shown in some detail and two others are represented in block form, is typically a personal computer, such as a Windows-based workstation, having a memory 24 containing communications software 27 and a modem 20 (or some other form of Internet connectivity, such as a T-1, ISDN line, etc.). Communications software 27 may be any software suitable for telecommunications, and is preferably browser or e-mail software. Modem 20 is used with communications software 27 for communication over network 11 with a DSP 12, more particularly a web server 35 of DSP 12.

Web server 35 is typically a programmed computer, more specifically one which supports a HyperText Transfer Protocol (http), that handles requests for records, documents and other services, and transmits such information over network 11. Network 11 is, for example, the Internet. Many suitable software programs for Web server 35 exist, including Netscape, Apache, Microsoft IIS, and O'Reilly.

Each computer 14 also has an input device 21 such as a keyboard and/or mouse and a display 23 (monitor) for communication with a user. It should be understood that computer 14 also may be those commercial devices known as "Web-TV" boxes, as are currently available from Phillips Electronics, Magnavox and Sony Corporation, or Network Computers as may be provided by Oracle and Microsoft. It also should be understood that hundreds of thousands, if not millions, of computers 14 may be coupled to network 11, and thus to DSP 12, as will become more apparent in the following discussion.

DSP 12, in addition to web server 35, includes a database connectivity engine 60, preferably COLD FUSION™ available from Allaire Corporation, connected to web server 35 for pre-processing an output from Web server 35. The database connectivity engine 60 is hereinafter also referred to as COLD FUSION 60. COLD FUSION 60 is a specific server side scripting language product which allows otherwise static information to be created dynamically by providing an interface between web server 35 and a database server 45 using the Open Database Connectivity (ODBC) protocol. ODBC is well-known in the art and therefore will not be further discussed. Other similar server side scripting products could be used, such as Web Objects and Microsoft's IDC technology.

Database server 45 is generally configured as an SQL database, using software programming such as that available from Oracle, Informix, Microsoft, or Sybase, and is operable to transmit and receive information between COLD FUSION 60 and a database 70. Database 70 is a typical storage medium as is well-known, more specifically database 70 is a conventional relational database.

A queue-watcher 40 ("Q-watcher 40") polls database server 45, which retrieves the requested information from database 70 and returns it to Q-watcher 40. Q-watcher 40 uses the information to generate text messages that are passed to a mail server 55 for transmittal to users.

Mail server 55 is a conventional device that reads text messages inbound on network 11, such as electronic mail (e-mail), that is communicated to web server 35 and sends the text message outbound on network 11. Any method for sending and receiving e-mail may be used. For example, for sending e-mail the well-known Simple Mail Transfer Protocol (SMTP), and a standard for reading e-mail, such as the well known Post Office Protocol (POP), are programmed into mail server 55, in what is now a conventional manner and, therefore, will not be described in further detail.

A parser 50 is connected to an output of mail server 55. Parser 50 is responsible for processing e-mail messages which arrive at mail server 55. Specifically, parser 50 determines which routine or routines should be called in database server 45 to process the received message, as will be discussed later. It is possible, however, that the parser is unable to determine this information from the e-mail message, for example, because of faulty transmission between computer 14 and mail server 55. Therefore, parser 50 is provided with an error subroutine which is activated in the event an error is determined. At this point, the e-mail is returned to the sender, delivered to customer service, or queued to database server 45 for transmission of an error message to the user.

Details of an embodiment of parser 50, COLD FUSION 60, Q-watcher 40, and database server 45 will be described below with reference to a preferred embodiment of a process of constructing a networking database in accordance with the present invention.

Become a Member

A preferred method of constructing a networking database includes adding records for individuals to the database 70 and establishing one or more defined relationships between the records for selected individuals, and will now be described.

For convenience, references in the following discussion to individuals, users and persons should be construed synonymously, and references to an individual in the context of database 70 should be understood to mean a record (or group of records) associated with the individual. It also should be recognized that the use of underscoring to connect together words also serves as a cross reference to the flow charts and an exemplary software routine in the microfiche appendix, and the use of periods to connect together letter-number combinations is associated with e-mail text messages and user displays.

There are two preferred methods of becoming a member. The first is by communication with web server 35, more conventionally understood as an interactive communication with the "Web-site" 90 of the DSP 12 over Internet network 11. The second is by e-mail communication with DSP 12 in response to an e-mail message originated from mail server 55. These are discussed in turn.

Figure 2:
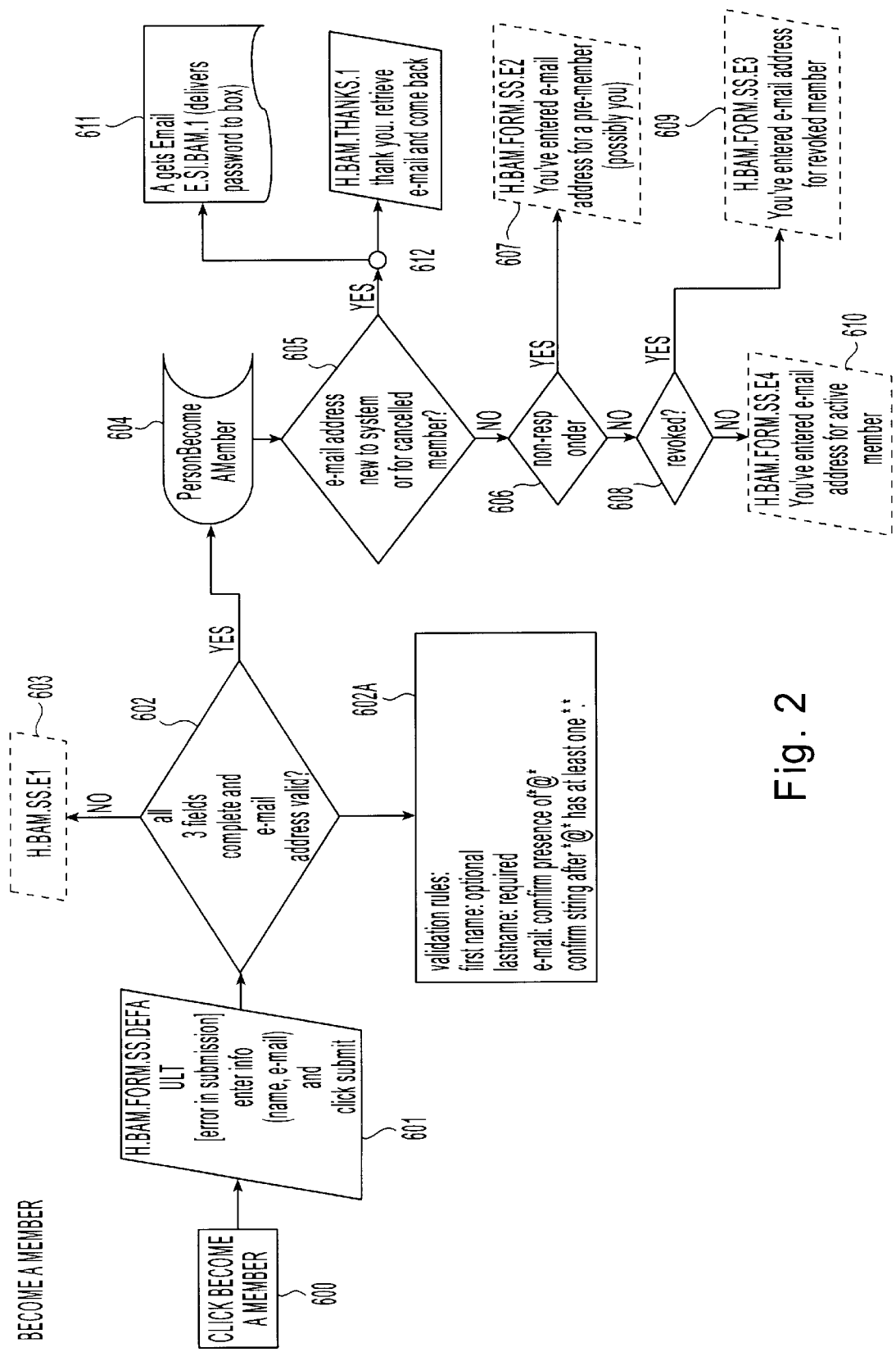
FIG. 2 is a flow chart illustrating routine, Become_A_ Member, in accordance with the NDS of FIG. 1.

Referring to FIG. 2, routine Become_A_Member (BAM) is illustrated. BAM is executed to allow a user to become a "member" of DSP 12. The user, through computer 14, accesses Web-site 90, and is required to "click" on box 600, which initiates routine BAM.

In step 601, a display screen of information is shown to the user, who in this context and others that follow is referred to as USER1, on display 23. It is to be understood that USER1 may be any user of DSP 12. Using input device 21, USER1 is required to enter specified personal information, preferably at least a last name and a valid e-mail address. It should also be understood that currently multiple users cannot use the same e-mail address and still have different records in database 70. This could be changed by a suitable variation in programming that will allow it. A particular user can have multiple e-mail addresses and map to the same record in the database. It should also be understood that USER1 also may add a first name as well as other information as is discussed herein. However, this other information is not required in this routine as a design choice.

At step 602, the routine determines whether a valid Internet e-mail address and last name have been entered, by applying validation rules 602A. Typically, a valid Internet e-mail address contains a string of text characters followed by an "@" symbol, followed by a second string of text characters, followed by a ".", and then a third string of text characters. For example, a@b.c would be identified as a valid address. Other e-mail address formats may be used. If step 602 determines that no valid address or last name (either one) was input by USER1 at step 601, then step 603 is executed. If, on the other hand, the validation requirements are met, the routine advances to step 604 where a routine Person_Become_A_Member is initiated by COLD FUSION 60, and executed in database server 45. Then, USER1 may proceed to become a member.

The Person_Become_A_Member routine 604 determines whether the entered e-mail address is in the database 70. In step 605, database server 45 determines whether the e-mail address belongs to one of an "active", "pre-registered", "revoked" or "canceled" member, all of which types of members will be discussed below. A canceled member is an individual whose information had been entered into the database 70 and was an actual member, but was removed from being a member in the database 70 voluntarily. A "revoked" user is defined as a user who has fulfilled all the sponsorship and registration requirements (see FIGS. 4A–4C), but had his privileges involuntarily removed from the database 70 for misuse.

If the e-mail address is new or for a canceled member, then steps 611 and 612 are executed, thereby sending an e-mail message, containing a password to USER1 at the user-given e-mail address input at step 601, and also thanking USER1 for entering at web server 35. A unique password is assigned to each user that becomes known to the database 70 to restrict unwanted users and allow known users, that is users who have registered with DSP 12 to confirm their identity. Each password stored in database 70 corresponds to a known user. A password may be a string of numbers or letters or a combination of both. It should be noted that sending a password to the e-mail address entered in step 601 insures that the password is sent only to the user, thus minimizing the likelihood of misuse or fraud.

If, on the other hand, at step 605, it is determined that the e-mail address is not new or for a canceled member then step 606 is invoked. At step 606, the database 70 is queried to determine whether the e-mail address is associated with a user that is a "non-responder" (such a user is also referred to as pre-registered). If it is, step 607 is executed. At step 607, a display, H.BAM.FORM.SS.E2, is delivered to USER1 informing the user that the e-mail address is associated with a non-responder. If instead the e-mail address input by USER1 is not for a non-responder, then step 608 is executed in which the database 70 is queried to determine whether the e-mail address is for a user that was revoked. If the user was revoked, then step 609 is initiated. Step 609 displays a screen H.BAM. FORM.SS.E3. Otherwise, step 610 is initiated. Step 610 invokes a screen at display 21, H.BAM-.FORM.SS.E4 that indicates to USER1 that the e-mail address entered is for an active member. An active member is one who has a current registration record in database 70 and has met the requirements for membership, i.e., the user has listed his demographic information with DSP 12 and has listed a relationship with at least one other person with DSP 12 and, if necessary, has responded to his sponsorship (i.e., having been identified to the database by a "USER1").

Typically, the routine depicted in FIG. 2 is used by a user who unilaterally desires to become a member of database 70.

USER1 Names USER2

Figure 3:
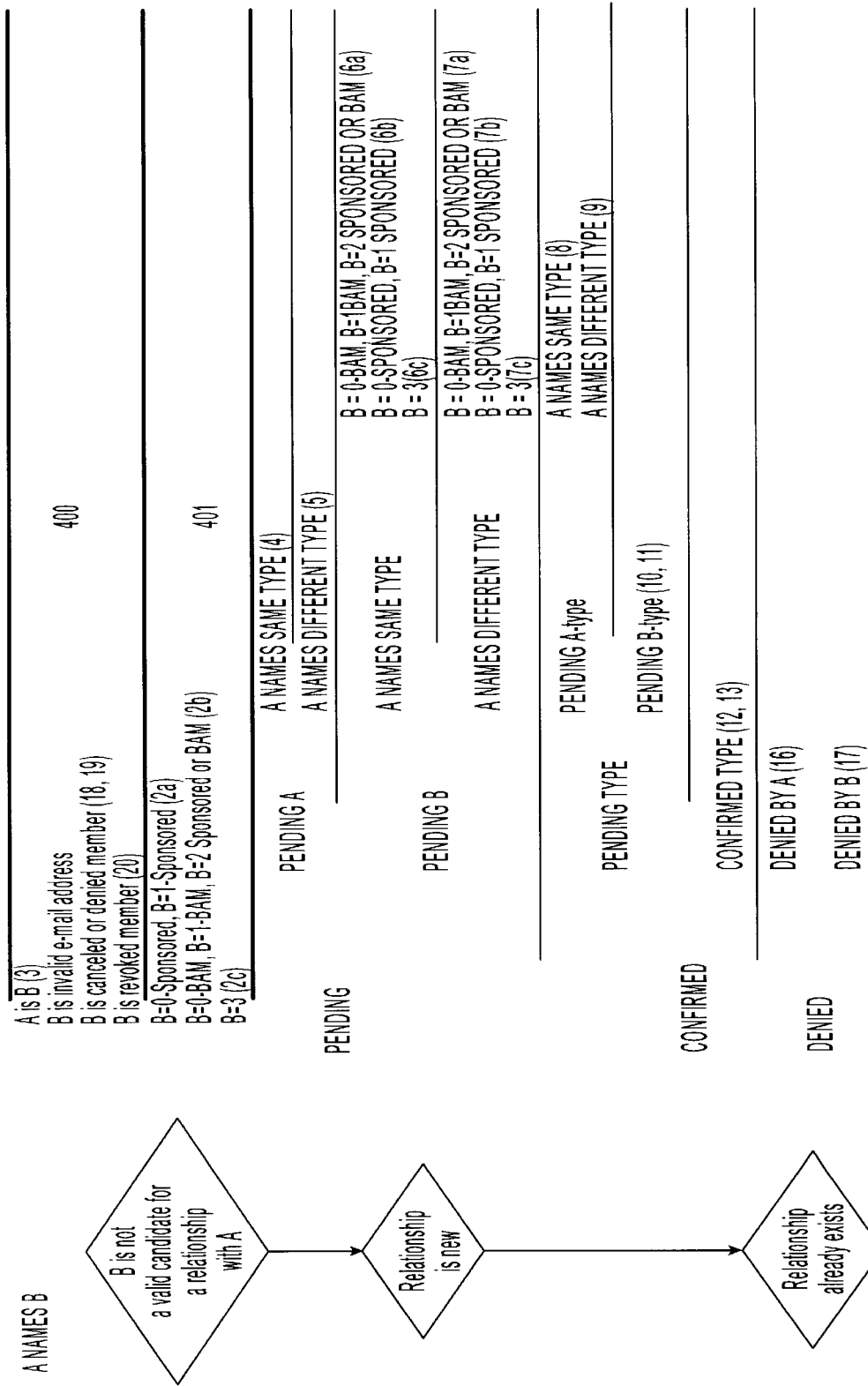
FIG. 3 is a flow chart showing routine, USER1_Names_ USER2 using the NDS of FIG. 1.

In a second technique to become a member, generally, USER1, also identified as "A" in the drawings and the routines of the Microfiche Appendix, for convenience, sends an e-mail message from its computer 14 to DSP 12 which is received by mail server 55. See FIG. 3. It is assumed that the e-mail message identifies a USER2 (also referred to as "B" in the drawings and the routines of the Microfiche Appendix, for convenience) and, thus, contains a formcode recognizable by parser 50 as will be explained. The inbound e-mail is processed by parser 50, which searches for any formcodes in the e-mail. If a formcode is found, then parser 50 queries the database server 45 to discover precisely who is the message sender. Parser 50 then processes the e-mail in view of the formcode and what information may be listed in database 70, and if appropriate creates a suitable record in database 70 for USER2. For example, if a record for USER2 already exists, a second such record will not be created. Referring now to FIG. 3, this is shown outlining both techniques. However, here the discussion will be directed to sponsoring a member.

Figure 9A:
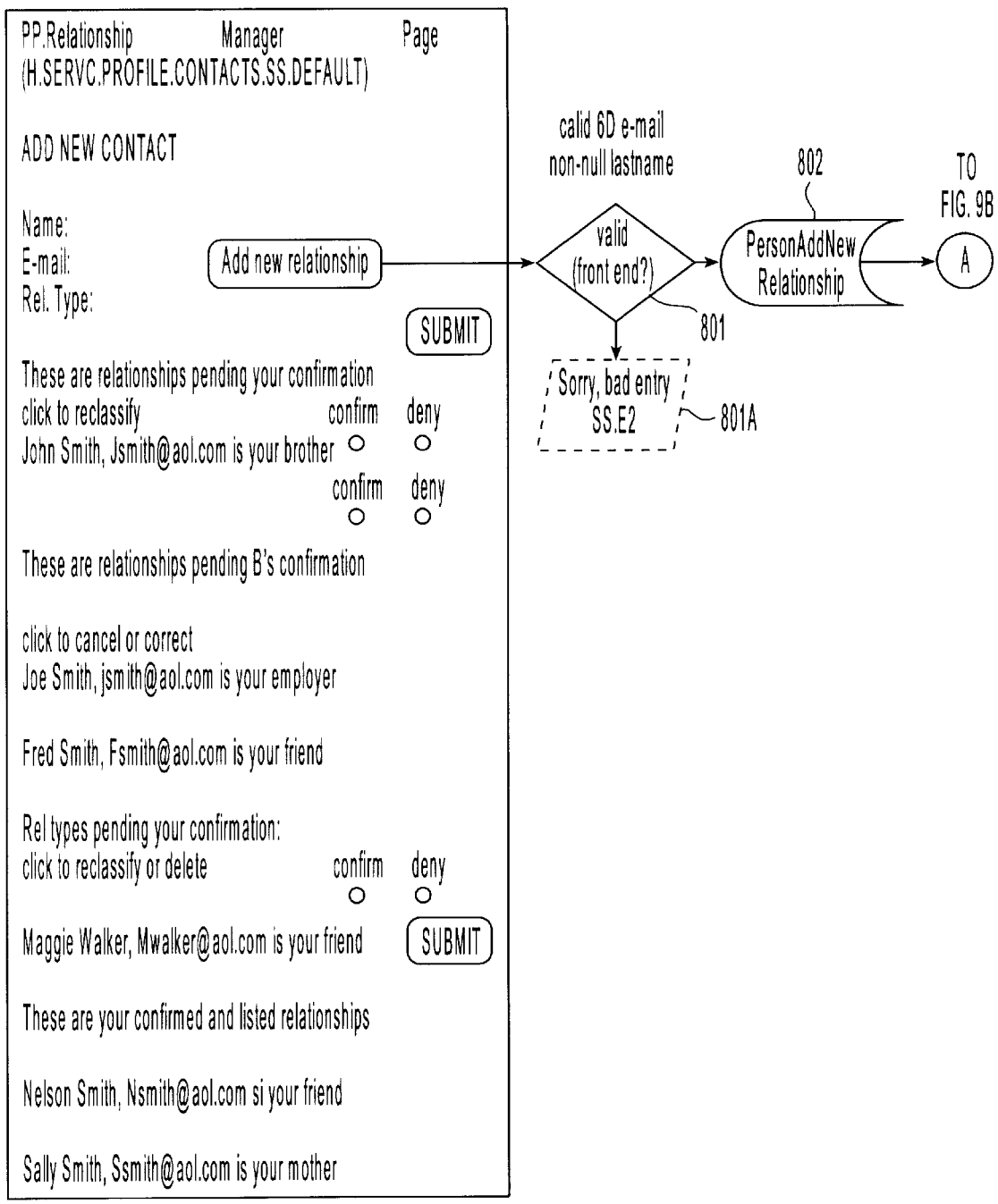
FIGS. 9A–9E are flow charts illustrating the process, Add New Relationship to a personal profile of the present invention.
Figure 9B:
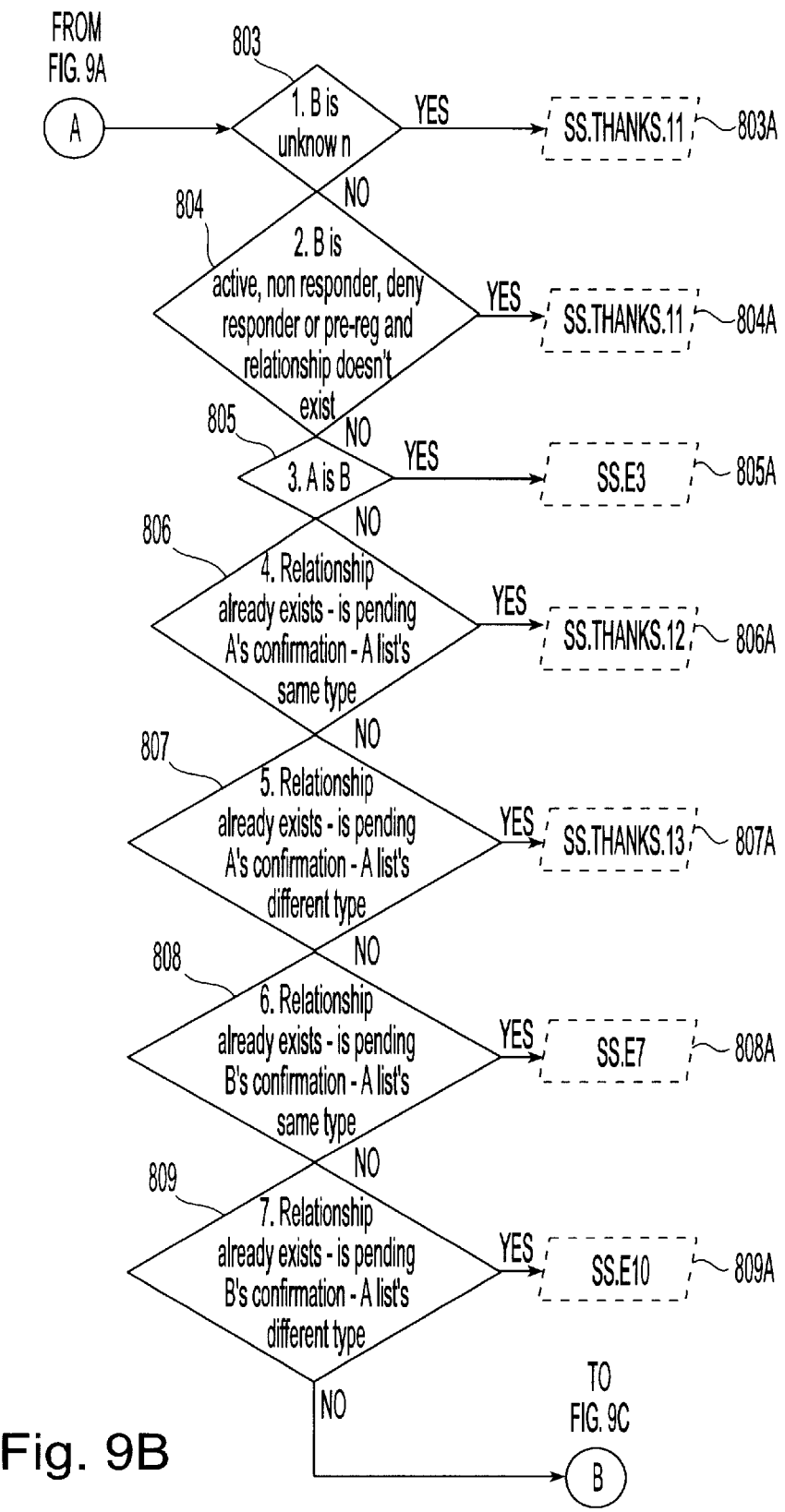
Figure 9C:
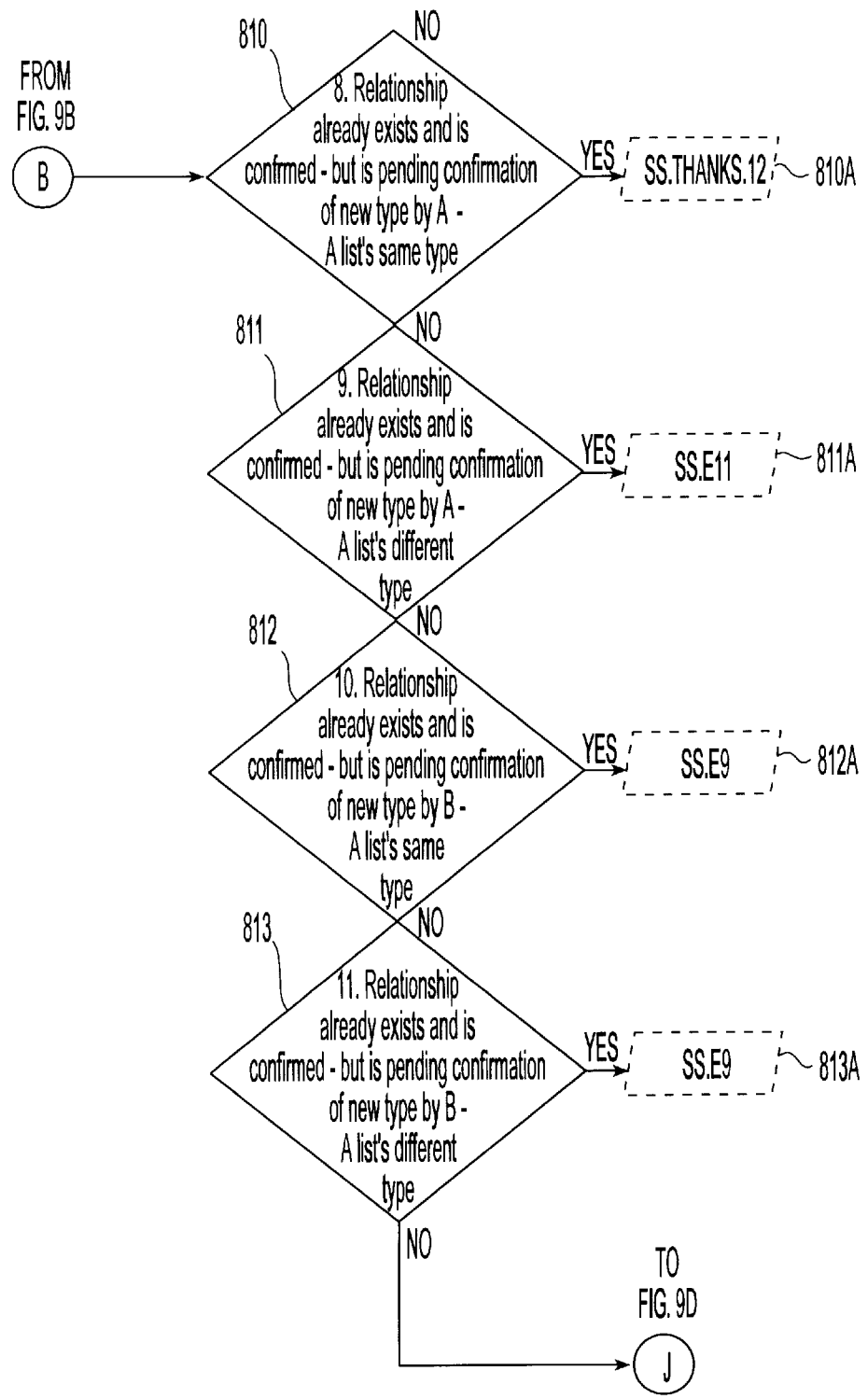
Figure 9D:
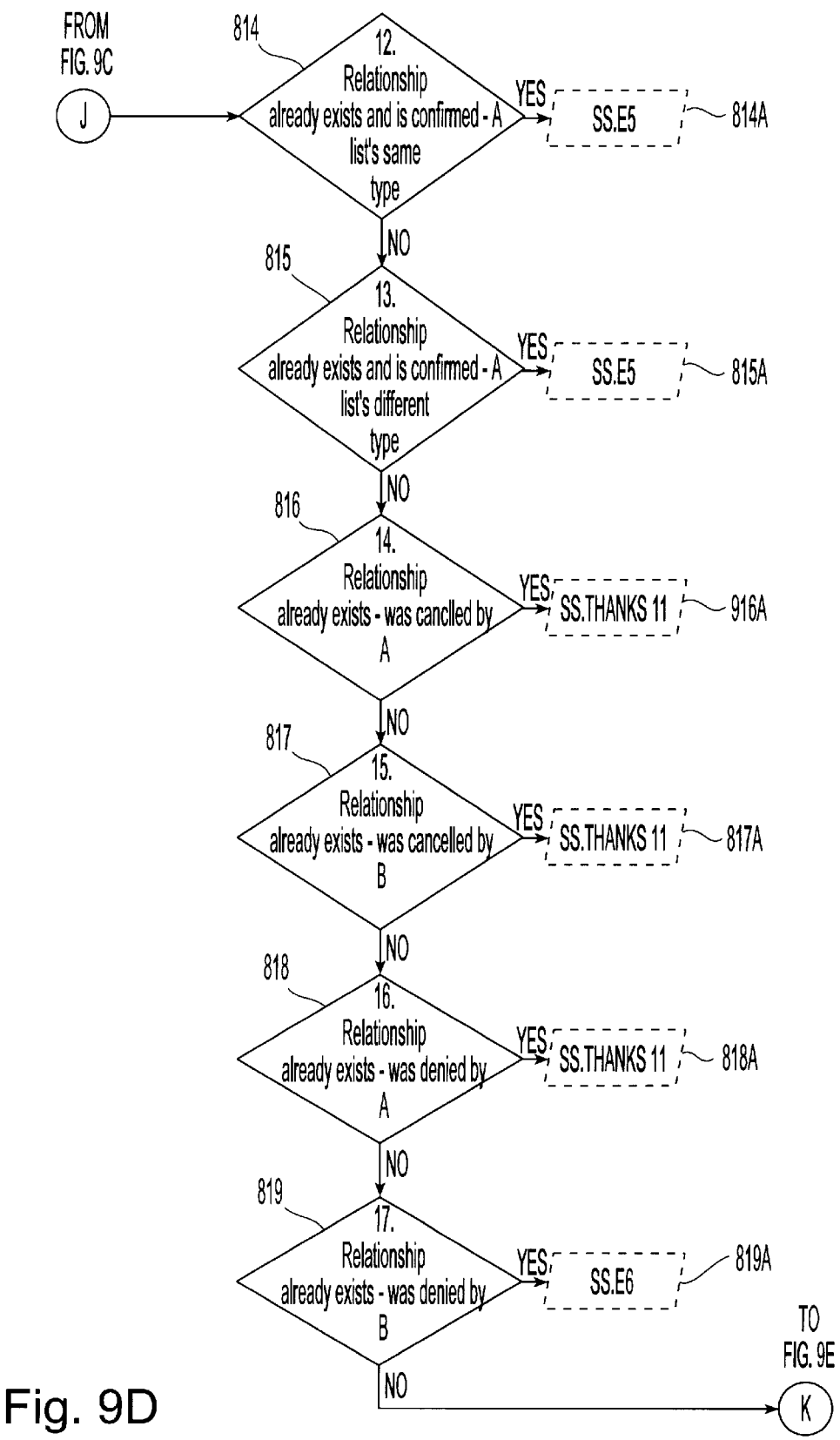
Figure 9E:
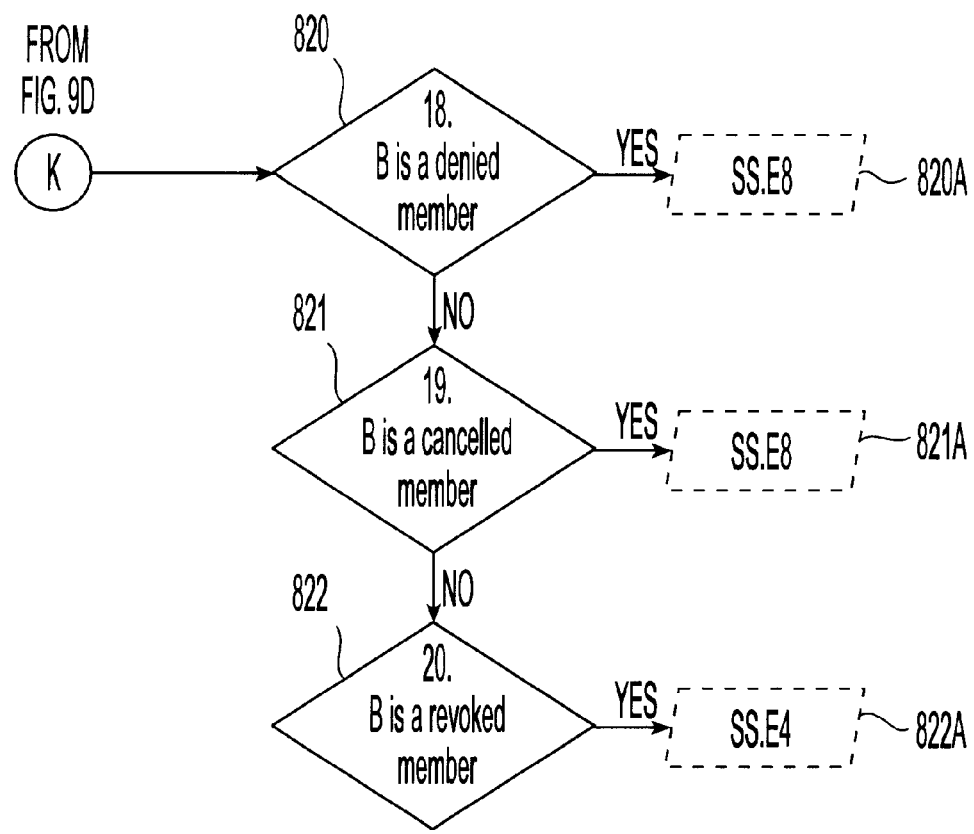

The DSP 12 determines whether USER2 is a valid candidate for a relationship with USER1, at step 400. In other words, it is determined whether: (i) USER1 is USER2 (see step 805; FIG. 9A as discussed elsewhere); (ii) USER2 has an invalid e-mail address (see step 602; FIG. 2 as discussed elsewhere); (iii) USER2 is a denied member (see step 820; FIG. 9B as discussed below); (iv) USER2 is a canceled member (see step 821; FIG. 9B as discussed below); or (v) USER2 is a revoked member (see step 822; FIG. 9C as discussed below).

If so, USER1 cannot list USER2. If not, the process proceeds to step 402.

At step 402, it is determined by database server 45 whether a relationship already exists between USER1 and USER2. The relationship may be pending (see steps 806–809; FIG. 9A); confirmed but pending confirmation of new type (see steps 810–813; FIG. 9A), confirmed (see steps 814–815; FIG. 9B), or denied by USER1 or USER2 (see steps 818–819; FIG. 9B).

It should be evident that generally the routine outlined in Personal Profile Add New Relationship (see FIGS. 9A-9B)

is similar to that used in the present routine; thus many of the steps are repeated and not discussed further.

Login/complete Registration/alerts

Once USER1 has been identified to DSP 12, a routine Session_Validation, in database 45, is executed to authenticate all transactions that are performed between the user and DSP 12. The user, at LOGIN, for example, is required to identify himself to DSP 12, by entering a PASSWORD and an e-mail address, each time he uses DSP 12. At the time of identification, routine Session_Validation assigns "session" information which indicates the identity of the user. For each transaction between the user and DSP 12, the routine insures that the user is, indeed, the person previously identified. It should be appreciated that, by authenticating each communication proffered by a registered user in DSP 12, the privacy of each member, who enters personal and professional information into database 70, is maximized. Then USER1 must undergo a LOGIN procedure to register and advance to the next stage of membership (see Session Validation below).

Figure 4A:
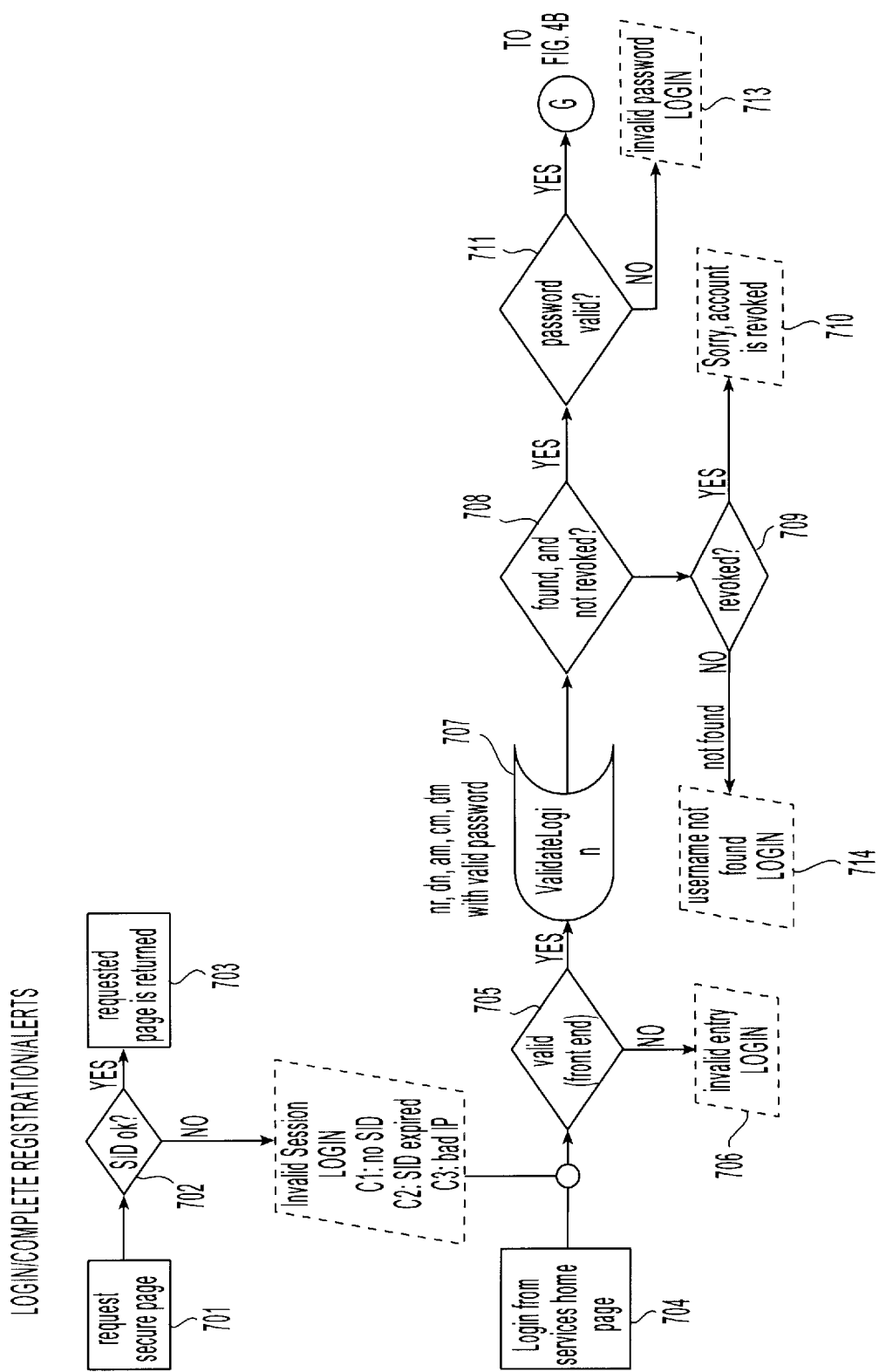
FIGS. 4A, 4B and 4C are flow charts illustrating routine LOGIN in accordance with the NDS of FIG. 1.
Figure 4B:
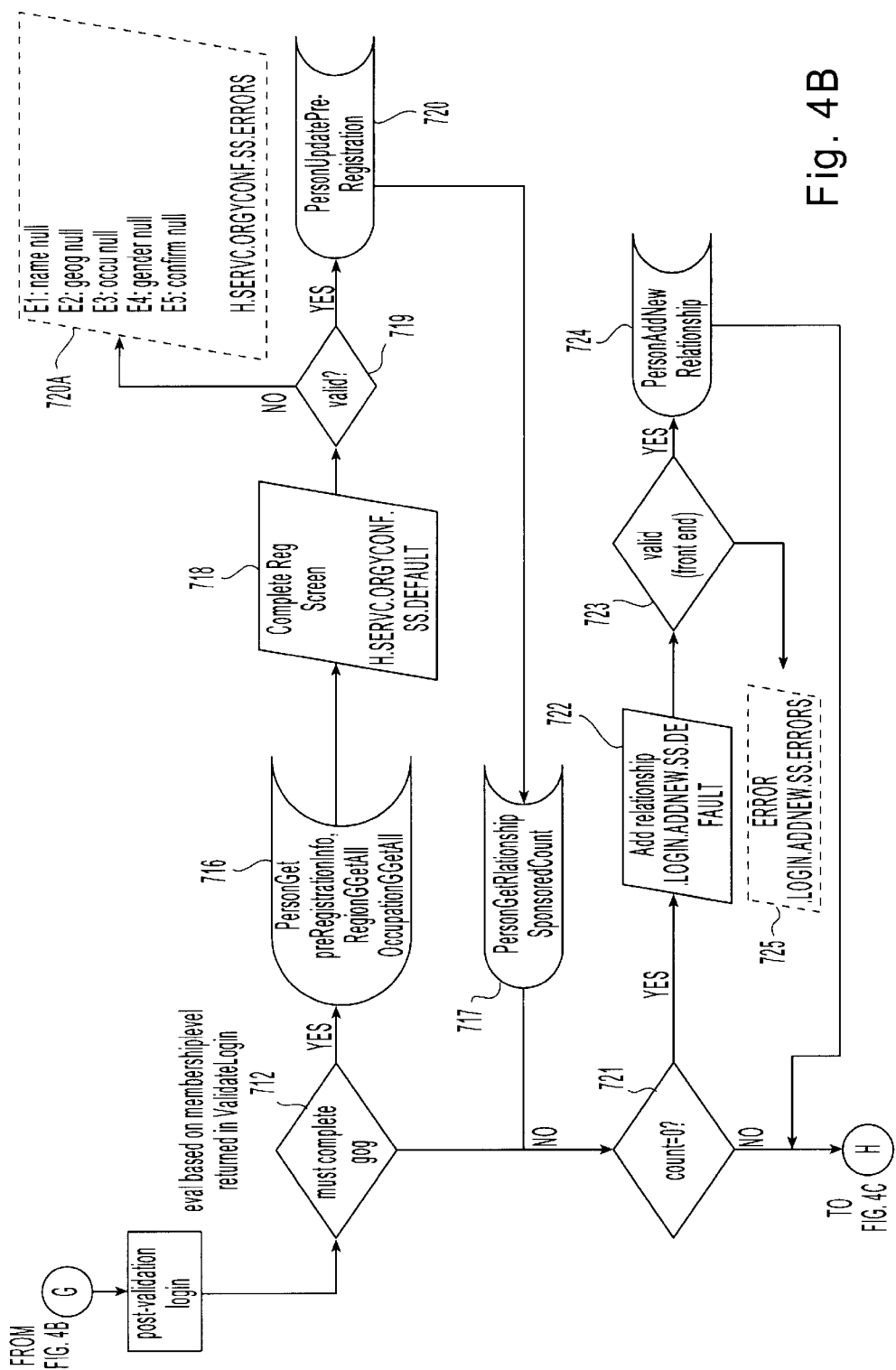
Figure 4C:
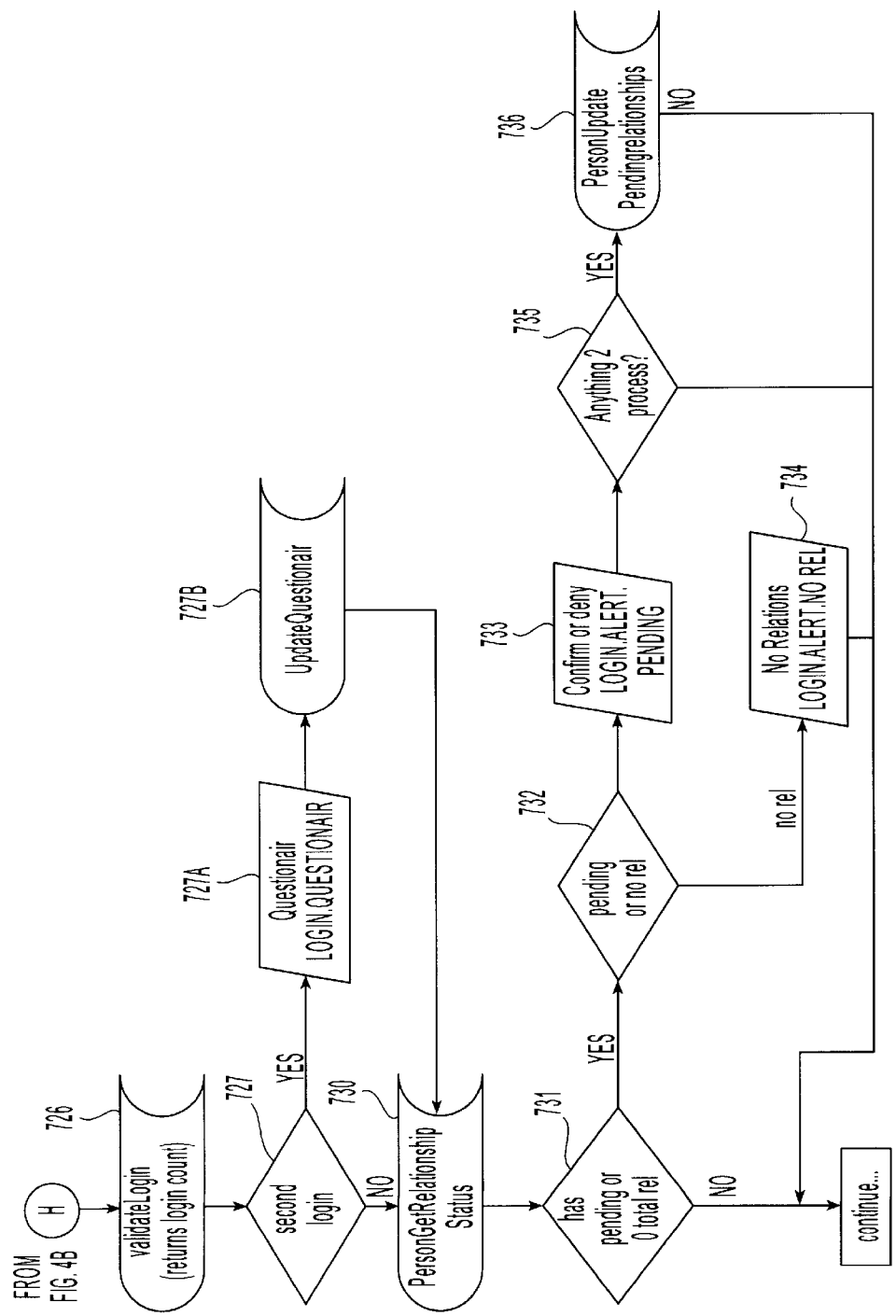

Referring to FIGS. 4A–4C, a flow chart is shown indicating the LOGIN program. Each user must undergo a LOGIN procedure to register and advance to the next stage of membership after he has been recognized by database 70. LOGIN allows a user to continue the registration process previously described in connection with FIGS. 2 and 3, update or change the user's personal profile (See FIGS. 10A–10F), or use the Web site 90 services available to registered members of DSP 12 (See FIG. 8).

In a preferred embodiment, the execution of Session Validation occurs at the Web site 90 (see FIG. 8) and is required each time a member uses the "personal profile manager", "network me" or "connect me" services, all of which will be discussed herein in connection with NDS 10.

In step 704, LOGIN is invoked. In this context, the user may be a USER1 or a USER2. The user who is "logged-in" is required to enter a "username", an e-mail address of the user which was previously stored in database 70. It is possible, however, the username includes the last name, first name, or another name (alias) chosen by the user. In addition to a username, the logged-in user must also provide the PASSWORD which was previously generated by database server 45 (see FIGS. 2 and 3).

The database server 45 then executes step 705 to determine whether the username is in a proper format, as in step 602. If not, then step 706 is invoked, which indicates to the user that the input is invalid. However, if the e-mail address is found to be valid, then steps 707 and 708 are initiated to verify that the e-mail address is found in the database 70 and has not been revoked. If the e-mail is not "found and not revoked", then step 709 is executed to determine whether the e-mail address is that of a revoked member. This determines whether the e-mail address assigned to the logged-in user has been "revoked" by DSP 12 due to improper or unauthorized use of DSP 12 by the logged-in user, as described herein. If the e-mail address is that of a revoked member, step 710 is executed and a suitable message indicating the same is displayed to the logged-in user. Otherwise, it is determined that the username is not found and step 714 is executed. Again, a suitable message to the logged-in user is displayed and the user is prompted to reenter the information.

If, at step 708, the output is yes, then PASSWORD is checked against what is listed in database 70 at step 711. If a match is found, that is the PASSWORD is valid, then step 712 (FIG. 4B) is executed. If not, however, step 713 is called, indicating to the logged-in user that the input is an invalid password and the user is prompted to reenter the information.

In step 712, database server 45 determines whether the logged-in user must complete his registration with DSP 12 by providing certain requested information. If so, the logged-in user is asked to provide selected information, more specifically, personal or professional information including, among other things, one or more of the following: geographic location, occupation, and gender. At this stage, steps 716–720A are executed to complete the registration process.

At step 716, COLD FUSION 60 invokes the database to perform a series of routines that are necessary for COLD FUSION 60 to present screen 718. For example, a routine Person_Get_Pre_Registration_Info is called to get information already entered for the user, a routine Region_G_Get_All is called to get a list of allowable geographic information about the user, and a routine Occupation_G_Get_All is called to get a list of allowable occupational information. At step 718, the registration screen is presented enabling the logged-in user to complete registration.

When complete, the input data is examined for valid input at step 719. If invalid information is found, an appropriate message (at step 720A) is displayed to the logged-in user who is prompted to re-enter valid information. Valid entries are accepted and processed at step 720 by COLD FUSION 60 to be stored in suitable fields of the logged-in user's record in database 70. The input data is sorted into the record for the user in database 70 by routine Person_Update_Pre_Registration_Info which updates the registration record in database 70.

At step 717, the database server 45 determines information about the user's relationships. More specifically, routine Person_Get_Relationship's_Sponsor_Count is executed to determine whether the relationship requirement is met.

The routine proceeds to step 721 where COUNT, the number of total relationships initiated or declared by the member, whether confirmed, denied or non-response, is evaluated.

If the COUNT at step 721 is zero, then steps 722–725 are invoked which prompt the logged-in user to add new relationships. In other words, the user is prompted to register a different person with DSP 12, for example, a friend, relative, or co-worker. If the new relationship information is not valid as determined at step 723, that is an invalid name or an invalid e-mail address for the person is input, as in step 602, then at step 725 the logged-in user is notified and prompted to reenter the information. If the information is valid, then at step 724 the routine Person_Add_New_Relationship is executed, which adds the new relationship to the record for the logged-in user, updates the record in database 70 with the information and adds a new person to database 70 if the person listed is not already in the system. This is also the starting point of the routine USER1_Names_USER2 as described above in connection with FIG. 3.

If the COUNT at step 721 is not zero, step 726 (FIG. 4C) is executed to refresh the session information from step 707. As a result, at step 727, COLD FUSION 60 evaluates whether this is a user's second login and, if so, in steps 727A and 727B, prompts him to add more information about himself for storage in database 70. The additional information may appear on a questionnaire screen at step 727A prompting the user to input a plurality of demographic information, such as age. Afterwards, or if the user does not elect to enter such information, the routine passes to step 730, wherein COLD FUSION 60 coupled with database server 45, using routine Person_Get_Relationship_Status, determines the state of the relationships between the logged-in user and others. In this regard, at step 731, it is determined whether any pending relationships or whether no relationships exist with the logged-in user. If the answer is no to both, then the logged-in user continues to use other areas of DSP 12. If the answer is yes, however, then COLD FUSION 60 determines at step 732 whether no relationships exist or whether any of the relationships need to be confirmed or denied at steps 733–734. If there are no relationships, step 734 is executed indicating that no relationships exist. If, on the other hand, pending relationships do exist, COLD FUSION 60 determines whether there is any new information to process at step 735. If there is not, then the logged-in user may move to another area of DSP 12. However, if there is, the database server 45 processes all incoming information and updates the pending relationships at step 736 before returning the user to continue use of DSP 12.

USER2 Responds

Figure 5A:
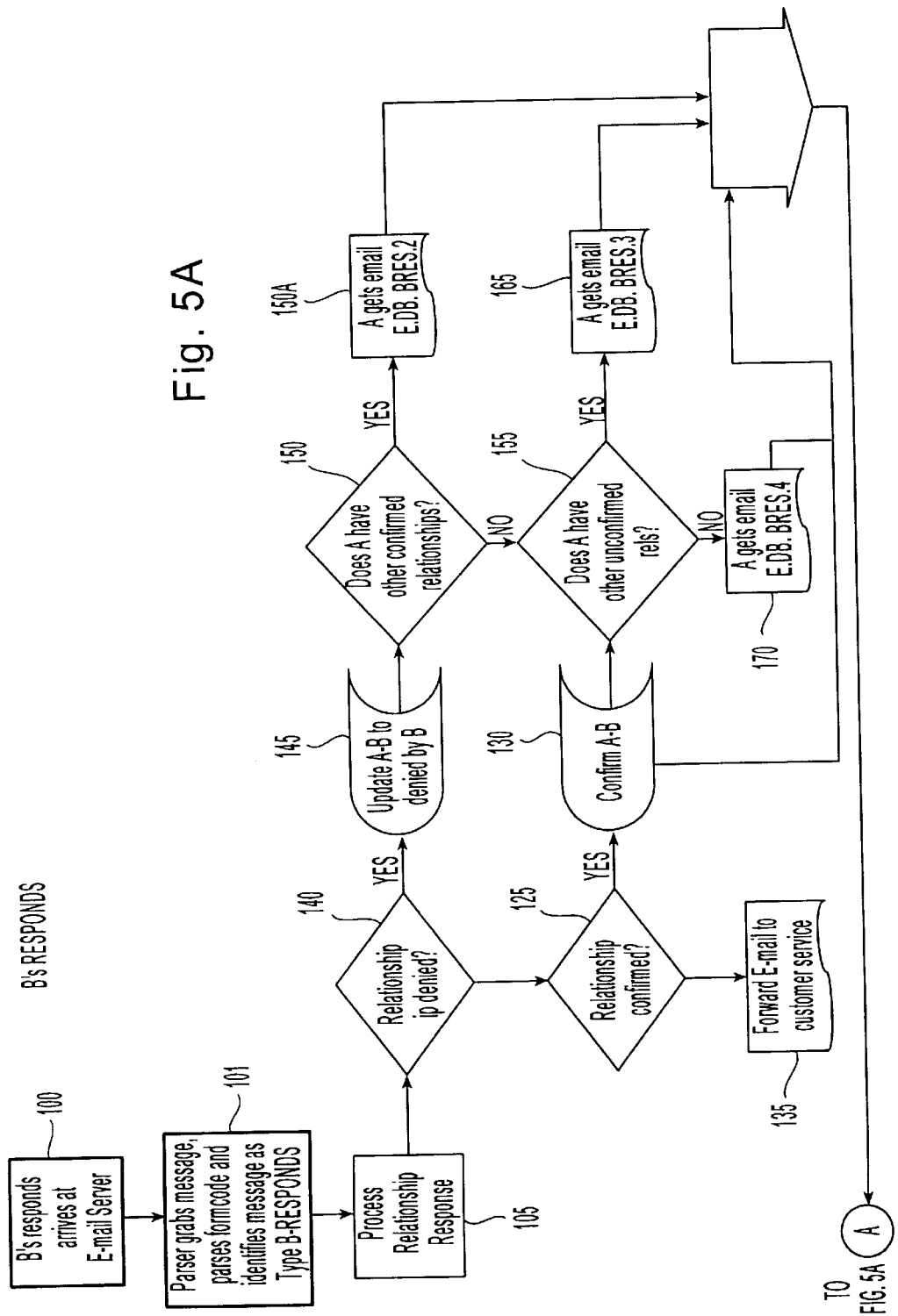
FIGS. 5A, 5B and 5C are flow charts showing the USER2_Responds routine of the NDS of FIG. 1.
Figure 5B:
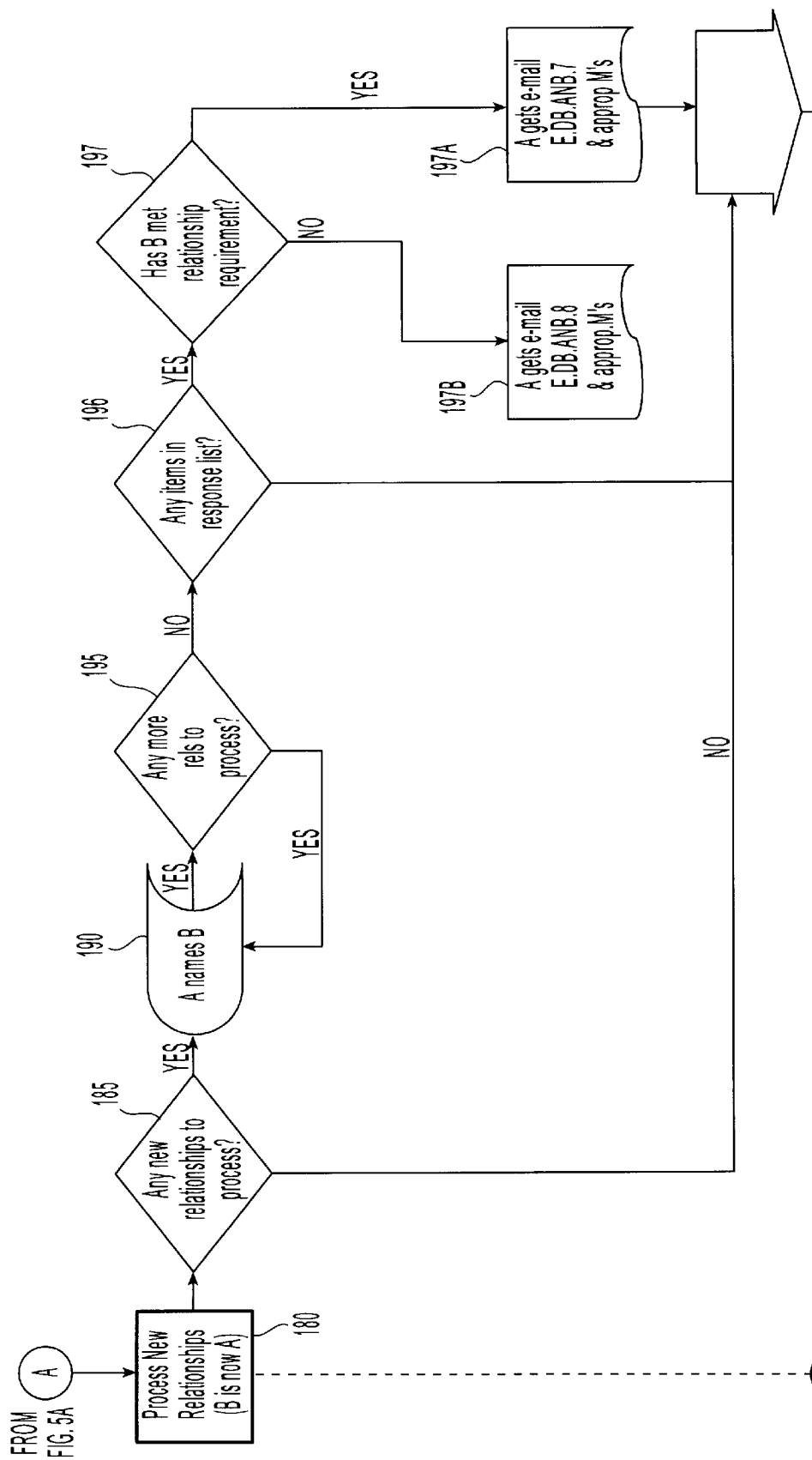
Figure 5C:
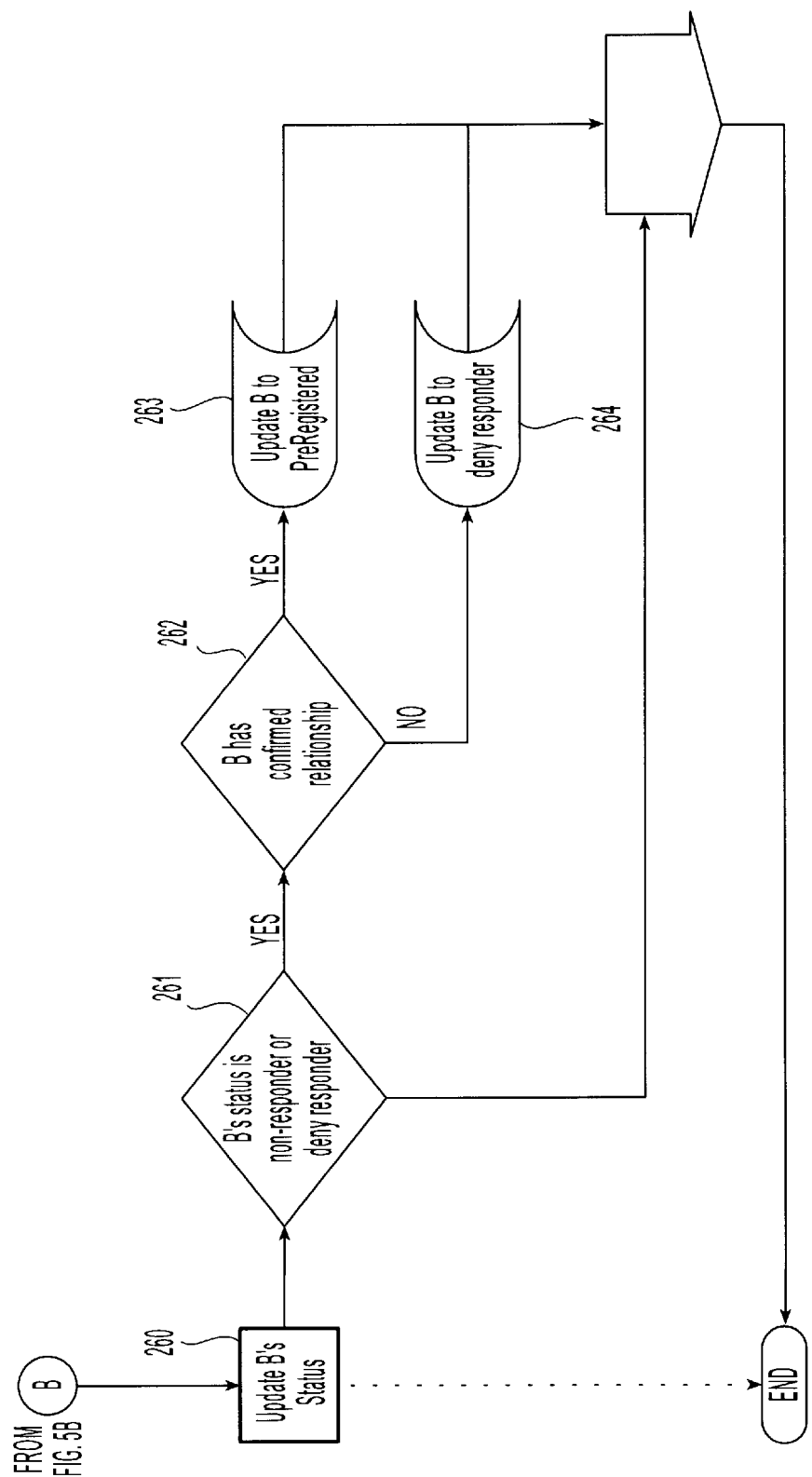

Referring now to FIGS. 5A–5C, a flow chart is shown illustrating the routine of parser 50 when an e-mail response arrives at mail server 55 from a USER2, wherein USER2 was identified to DSP 12 by a given USER1. At this stage, parser 50 processes an e-mail from USER2 in response to a formcode which was previously generated by Q-watcher 40 when USER2 originally was sent a message. The formcode contains information which allows parser 50 to determine what type of message arrived at mail server 55. Any inbound message to mail server 55 determined to have an unidentifiable, unknown or duplicate formcode is forwarded to a customer service person for manual processing.

In steps 100 and 101, mail server 55 receives an e-mail response from USER2 in response to an initial e-mail sent by Q-watcher 40, in the routine USER1_names_USER2 previously discussed. Parser 50 parses the e-mail, sees the formcode, and reacts to a designated formcode from the e-mail message as discussed above. Procedure Process_Relationship_Response is initiated at step 105 to determine and update, as appropriate, the status of the relationship between USER1 and USER2.

At step 140, if a DENY response to a proposed relationship is sensed, then database server 45 updates database 70 in step 145, indicating that USER2 has denied a relationship with the given USER1. In this case, database server 45 verifies whether the given USER1 has any other confirmed relationships at step 150. If so, then step 150A is executed and an e-mail message E.DB.BRESP.2 is initiated by parser 50 to the given USER1, indicating that USER2 has denied the relationship. The routine, thereafter, passes to step 180 (FIG. 5B).

If the answer to step 150 is no, however, in step 155, the database server 45 searches for other unconfirmed relationships between USER1 and another user without a CONFIRM or a DENY. If the answer is yes, that is, if there are other unconfirmed relationships without a CONFIRM or DENY, then step 165 is executed. At step 165, an e-mail message E.DB.BRESP.3 is sent to the USER1 indicating that USER2 has denied the relationship, but that other unconfirmed relationships are pending. If at step 155 it is determined that USER1 has no other unconfirmed relationships without a CONFIRM or DENY, then at step 170 an e-mail message E.DB.BRESP.4 is sent to USER1 indicating this fact, and prompting USER1 to provide new relationship information.

Referring again to step 140, if the relationship is not denied, step 125 is executed to determine whether the relationship was confirmed. If, at step 125 a CONFIRM response is sensed, then at step 130, the relationship of USER1 to USER2 is confirmed, and the database records for USER1 and USER2 are accordingly updated. If the relationship is not confirmed, the routine passes to step 180.

In step 180 (FIG. 5B), database server 45 executes a routine Process_New_Relationship. In this routine, at step 185, database server 45 determines the existence of any new relationships being proposed by USER2 in the e-mail message. If none exist, the procedure continues to step 185A. At step 185A, database server 45 determines whether the relationship between USER1 and USER2 was neither confirmed nor denied. If yes, the e-mail is forwarded to customer service. If not, the procedure continues to step 260 (FIG. 5C). If, on the other hand, the answer is yes, then parser 50 creates a list of all new relationships listed by USER2. In this context, the USER2 is redefined as a given USER1 and the users identified in USER2's e-mail are redefined as USER2 (s), by executing steps 190–197B. This is similar to USER1_names_USER2 (see FIG. 3). When all of the relationships have been processed, at step 195A, database server 45 determines whether the relationship between USER1 and USER2 was neither confirmed nor denied. If yes, the relationship is updated as CONFIRM (as in step 130). If not, the procedure continues to step 196. When the output of step 196 is no, indicating that no errors have occurred in the steps 190 and 195, step 260 is executed. If the answer at step 196 is yes, then step 197 is invoked to determine whether USER2 has met the relationship requirements. If so, step 197A is executed and parser 50 sends USER2 E.DB.ANB.7 indicating only that the errors are encountered. If not, however, step 197B is executed, noting that USER2 has not fulfilled all the requirements for membership. After steps 197A–B, step 260 is invoked.

Step 260 updates the status of USER2 in database 70. In step 261, it is determined whether USER2 is a non-responder or deny-responder. If not, then no update is performed and the routine is terminated. However, in the event that USER2 is a non-responder or deny-responder, step 262 is executed. In step 262, if USER2 has confirmed his relationship with USER1 or listed additional relationships, step 263 is invoked to update USER2 to a "pre-registered" status. Otherwise, USER2's status is updated to "deny-responder" in step 264. After steps 263 and 264, the routine stops.

As it will be understood, by the foregoing processes, a very large number of users can become established in the database 70 with defined relationships to selected other users, and in which other users confirm the validity of the defined relationship and perhaps of the type of relationship. In this way, a networking database is established, verified and confirmed. As will be discussed, a registered user can thus access the database and determine a chain of overlapping confirmed relationships in DSP 12 with any other confirmed registered user that is part of the chain.

USER2 Responds to Relationship Type Confirm Request

Figure 6:
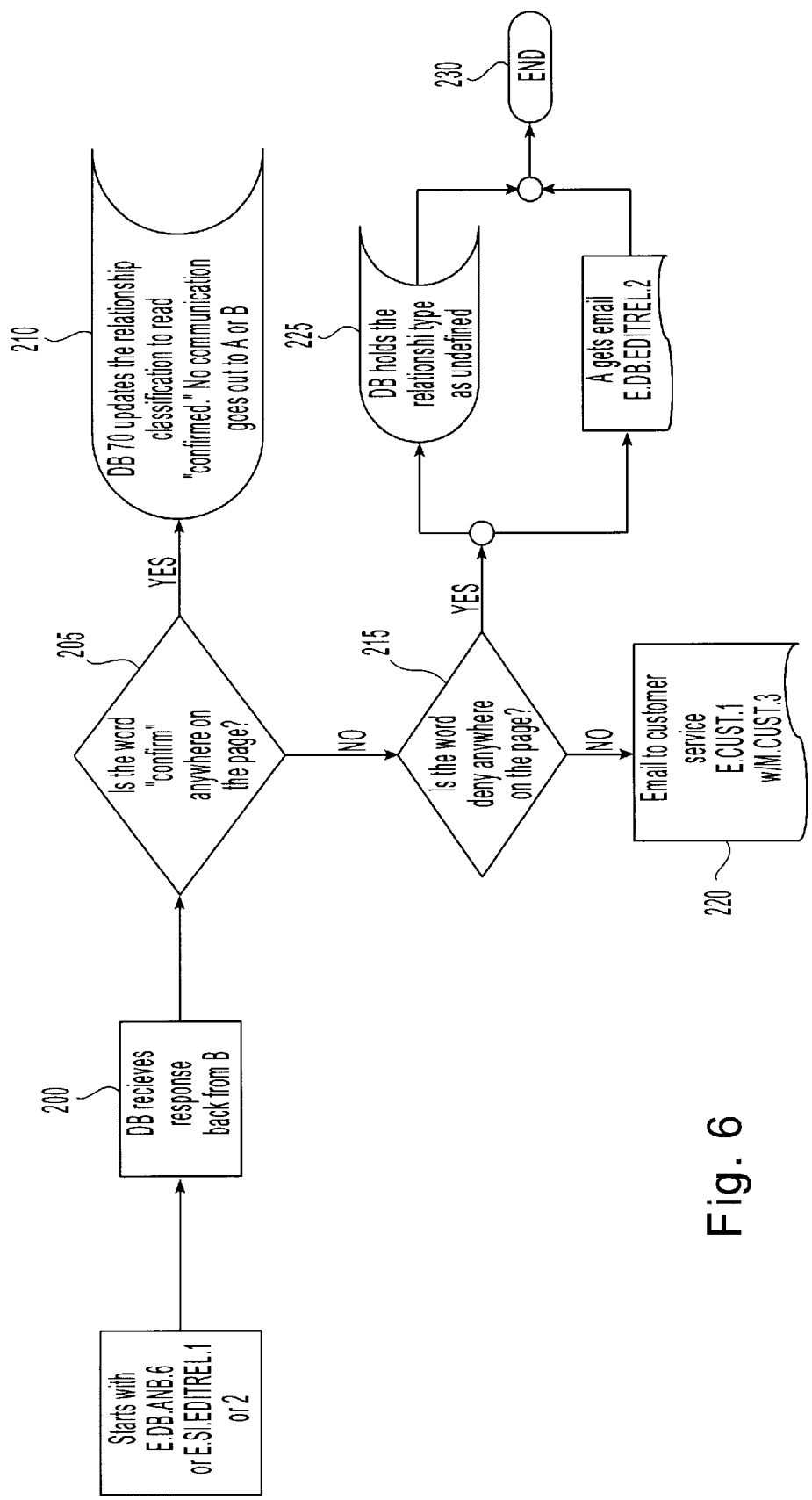
FIG. 6 is a functional flow diagram showing the process, USER2_Responds_to_Relationship_Type_Confirm_ Request, using the NDS of FIG. 1.

Referring to FIG. 6, in step 200, parser 50 starts, upon detection of a suitable response from USER2 (also referred to as "B") received via mail server 55, to update the type of relationship state between USER2 and USER1 (also referred to as "A"), which was identified as one of CONFIRM or DENY. A CONFIRM indicates that USER2 has accepted the type of relationship proposed by USER1. On the other hand, DENY, indicates that USER2 did not confirm a relationship type listed by USER1. If in step 205, the presence of a CONFIRM in an e-mail message is determined by parser 50, then at step 210, database server 45 updates the status of the proposed type of relationship to CONFIRM in database 70. Otherwise, parser 50 searches for DENY at step 215. If a DENY is not found, then parser 50 executes step 220 and a message, E.CUST.1w/M.CUST.3, is sent to customer service, indicating that the e-mail message is not a suitable response. If a DENY is found, then parser 50 executes step 225 in which the database 70 modifies the relationship type to unspecified. Subsequently, an e-mail message, E.DB.EDITREL.2, is sent by parser 50 to USER1. At step 230, the operation is ended. This routine is typically used in response to USER1 proposing a particular type of relationship with USER2, and USER2 (having previously confirmed the relationship), may separately confirm or deny the type of relationship proposed by USER1.

USER1 Responds to a Request to Verify a New E-mail Address

Figure 7:
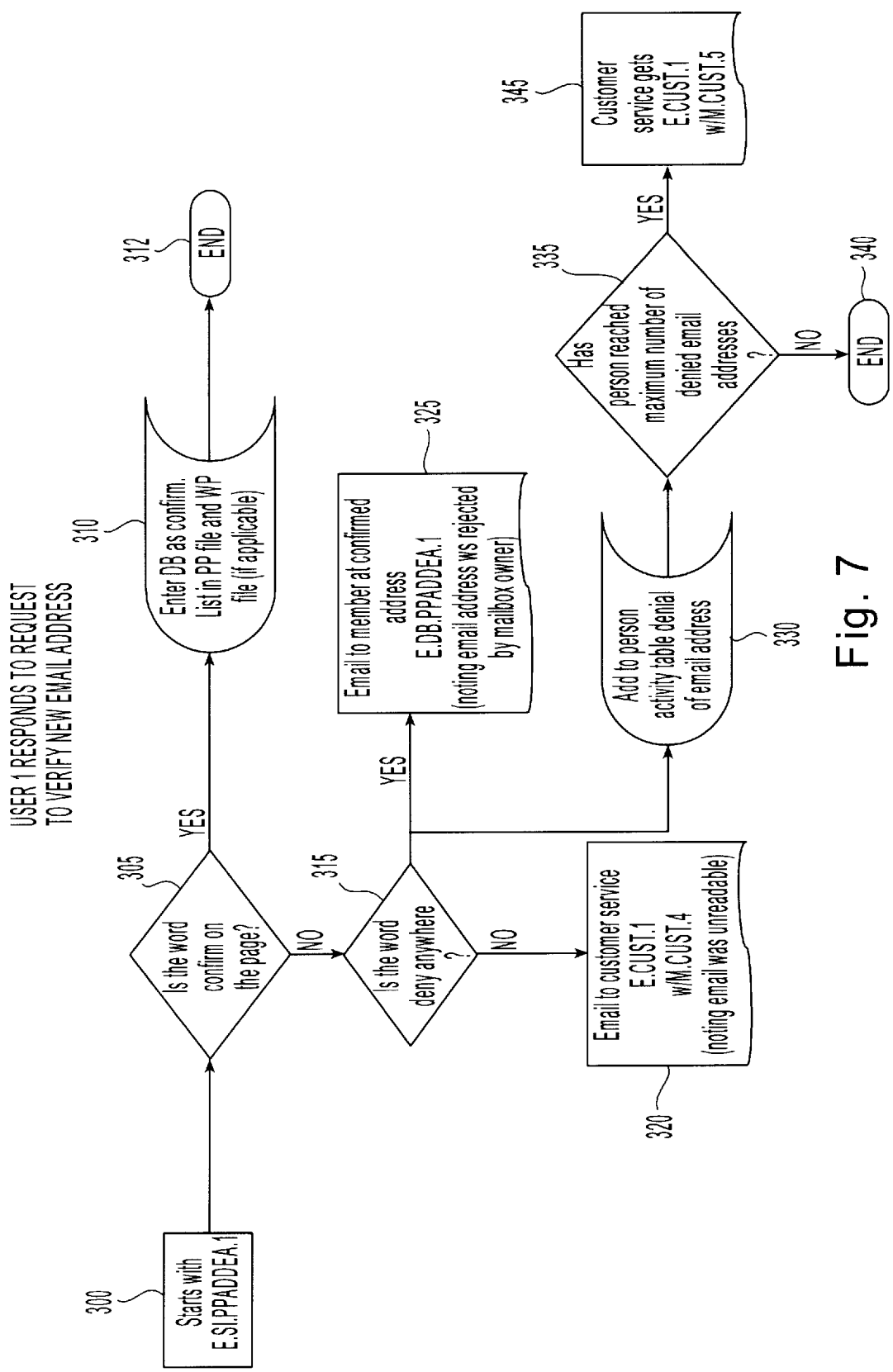
FIG. 7 is a flow chart illustrating routine, USER1_ Responds_to_a_Request_to_Verify_a_New_E-mail_ Address, in accordance with the NDS of FIG. 1.

When an active user desires to change or add an e-mail address, the personal profile is accessed and an e-mail verification routine is applied. For example, the routine prohibits the user from entering the e-mail address of another user already in the database. Referring to FIG. 7, in step 300, parser 50 processes an inbound e-mail to determine whether a new e-mail address that has been listed by the user has been verified and should be listed in database 70. At step 305, the same query as in step 205 is performed. Here, if the answer CONFIRM is found, the e-mail address in the database 70 is listed as CONFIRM in step 310. The e-mail address is also listed as CONFIRM at the "personal profile screen" and in the "white pages", each of which will be discussed below. In step 312, the procedure is terminated.

If no CONFIRM is found in step 305, then step 315 is executed. Step 315 determines the presence of DENY. If no DENY is found, then an e-mail, at step 320, is sent to customer service for manual processing, E.CUST.W/M.CUST.4. On the other hand, if a DENY is found, at step 325 a message is sent to a confirmed e-mail address for the user who had listed the new email address. Simultaneously, step 330 is executed wherein information is added to database 70 indicating that the e-mail address was denied. The routine ends at step 340.

Services Web-site

Figure 8:
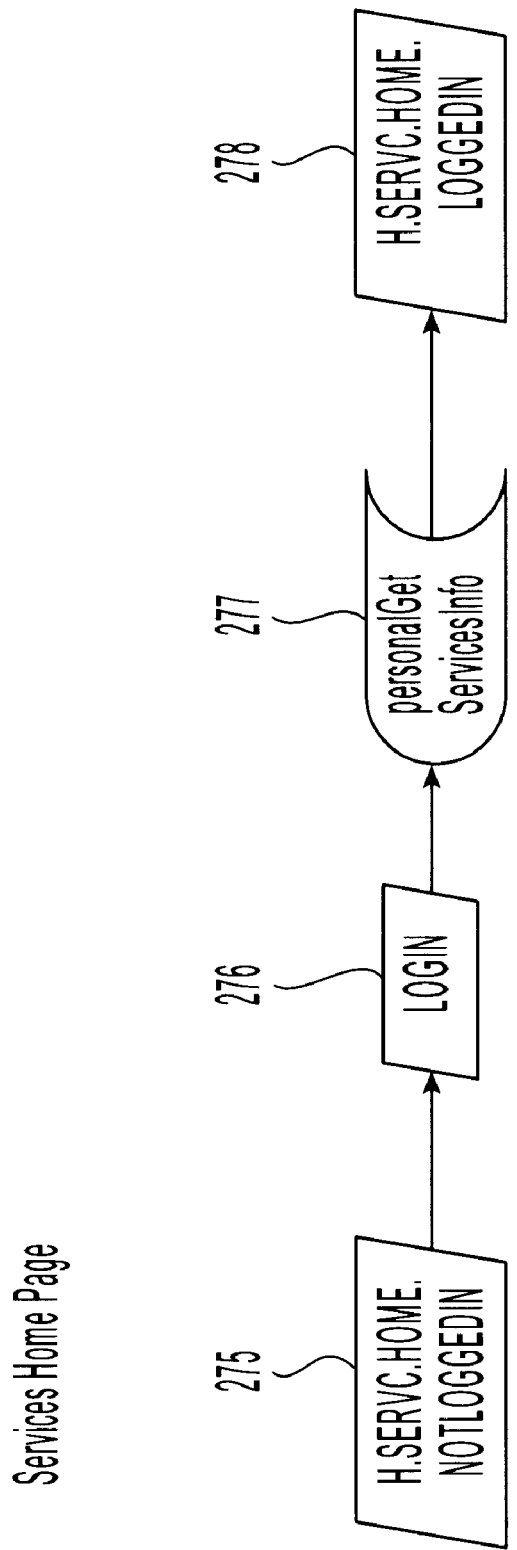
FIG. 8 is a functional flow diagram showing the Web-site Services routine of the NDS in FIG. 1.
Figure 18:
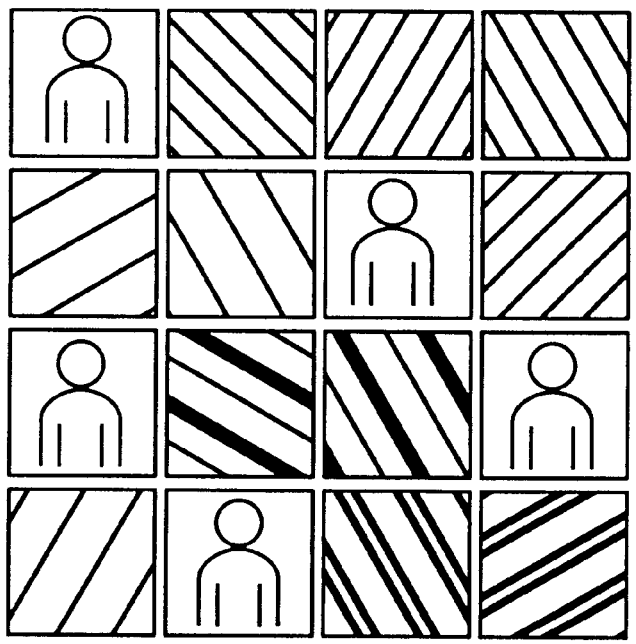
FIG. 18 is an example of a home page on a Web site according to the present invention.

Referring to FIG. 8, a user enters the web-site 90 (FIG. 18) through Web server 35 at step 275. The user is first shown a pre-LOGIN screen. At this stage, the user has access to all public services provided by DSP 12. It is contemplated that public services include the white pages described herein and an "about" section. To access any one of the public services provided by DSP 12, the user simply clicks a desired box in the displayed screen in a conventional manner. In a preferred embodiment, all public services are highlighted. However, it is possible that the member services boxes be shaded gray, indicating that they are inaccessible to the user.

The user also may click on the LOGIN box at step 276, as previously discussed. Once the user has completed the LOGIN procedure, COLD FUSION 60 executes routine Person_Get_Services_Info at step 277. In step 277, the user is validated as a member, and COLD FUSION 60 executes step 278. At step 278, the user is permitted access to valid member services, such as "marketplace", "connect me" and "network me", each of which is described below. In this case, boxes indicating the member services are highlighted as the above public services. It should be noted that a member may still access the public services of DSP 12 even after a LOGIN. Moreover, member services are executed in the same manner as previously described for the case of public services.

Personal Profile

The "Personal Profile" screen 102 (FIG. 9A) allows the user several options to update and/or add relationships within database 70. The options will be discussed below in turn.

1. Add New Relationships

One function for which Personal Profile screen 102 is used is add new relationships. In the embodiment, referring to FIGS. 9A–9B, at the Web-site 90 personal profile screen 102, a user may add a new relationship by clicking on "Add New Relationships". The user is then required to submit selected information. In the preferred embodiment, the information is input into four separate fields displayed on profile page 102: first name, last name, e-mail address, and relationship type (father, mother, employee, etc.) To initiate the process, the user is required to at least enter a last name, an e-mail address and a relationship type. Other information could be required.

At step 801, the entry by the user, in this context, USER1 is validated. If invalid, the user is returned to personal profile screen 102 at step 801A. If valid, however, COLD FUSION 60 passes the information into stored procedure Person_Add_Relationship in step 802.

At step 803, it is determined whether the input person, in this context a USER2, is unknown. If so, a suitable message is displayed at step 803A, and an e-mail is sent to USER2 inviting USER2 to join DSP 12 and confirm the relationship with USER1 and a new record for USER2 is established in database 70.

In step 804, if USER2 is known, (i.e., an active, non-responder, pre-registered or denied member) and has no relationship history with USER1, then step 804A is executed, wherein an email is sent to USER2 inviting him to confirm the relationship to USER1 and USER1 is notified that this will occur. At step 805, COLD FUSION 60 determines if USER1 has entered his own e-mail address. If so, then step 805A is executed notifying the user of the error. At step 806 it is determined whether a relationship between USER1 and USER2 has already been proposed by USER2, and is pending confirmation from USER1. If yes, the database 70 confirms the relationship and a message is presented to USER1 at step 806A indicating that the relationship was confirmed. It should be noted that, in step 806, USER1 listed the same relationship type as USER2 had already listed in the database 70.

At step 807, it is determined whether USER2 has a relationship with USER 1 pending USER1's confirmation and the relationship that USER1 proposed with USER2 is a different type. If yes, the relationship is confirmed and the relationship type is listed as unspecified in database 70. Subsequently, step 807A is executed and an e-mail message is sent to USER2 informing him of the request for reclassification of the relationship type.

At step 808, if a relationship between USER1 and USER2 was already listed by USER1 in database 70 and is pending confirmation by USER2 of the same type, at step 808A a message reminding USER2 of his pending confirmation is sent by database server 45, and USER1 is notified of the pending relationship.

In step 809 it is determined whether USER1 entered a different type of a pending relationship already listed by USER1, even though the relationship is pending USER2's confirmation. If so, step 809A is executed and USER1 is notified that the relationship type cannot be reclassified.

Steps 810, 810A, 811, 811A, 812, 812A, 813, and 813A operate in the same manner as steps 806, 806A, 807, 807A, 808, 808A, 809, and 809A. However, the relationship between USER1 and USER2 has already been confirmed in database 70, but a new type is pending confirmation by either USER1 or USER2. In step 810, if USER1 has attempted to reclassify the relationship to the same relationship type that is pending USER!'s confirmation, then in step 810A USER1 is notified that the relationship type has been confirmed and database 70 is updated accordingly. In step 811, if USER1 has attempted to reclassify the relationship to a different relationship type that is pending USER1's confirmation, then in step 811A USER1 is informed that USER1 may only confirm or deny the reclassification. In step 812, if USER1 has attempted to reclassify the relationship to the same relationship type that is pending USER2's confirmation, then in step 812A USER1 is informed that such an action cannot be taken while the reclassification is pending USER2's confirmation. In step 813, if USER1 has attempted to reclassify the relationship to a different relationship type that is pending USER1's confirmation, then in step 813A USER1 is informed that such an action cannot be taken while the reclassification is pending USER2's confirmation.

If at step 814, USER1 enters the same type and the relationship between USER1 and USER2 is already confirmed in database 70, step 814A is executed informing the user that he has committed an error. At step 815, if the user enters a different type and the relationship is found as confirmed in database 70, step 815A is executed indicating that the relationship has already been confirmed, then step 815A is executed.

If a confirmed relationship in the database 70 is listed as having previously been cancelled by USER1 (step 816) or, cancelled by USER2 (step 817), or a pending relationship had been denied by USER1 (step 818), step 803A is executed as described above and an e-mail is sent to USER2 requesting that USER2 confirm the relationship and database 70 is updated accordingly.

If the relationship was previously denied by USER2, at step 819, step 819A is executed and USER1 is notified that the relationship was denied by USER2 and cannot be relisted by USER1.

At step 820, if USER2 is a denied member, USER1 is notified that USER2 does not wish to be contacted at step 820A. In step 821, if USER2 is a cancelled member, step 820A is executed.

In step 822, if USER2 is a revoked member, USER1 is notified at step 822A that USER2 is, indeed, a revoked member and that a relationship cannot be established with a revoked member.

2. Relationships Pending Confirmation

Figure 10A:
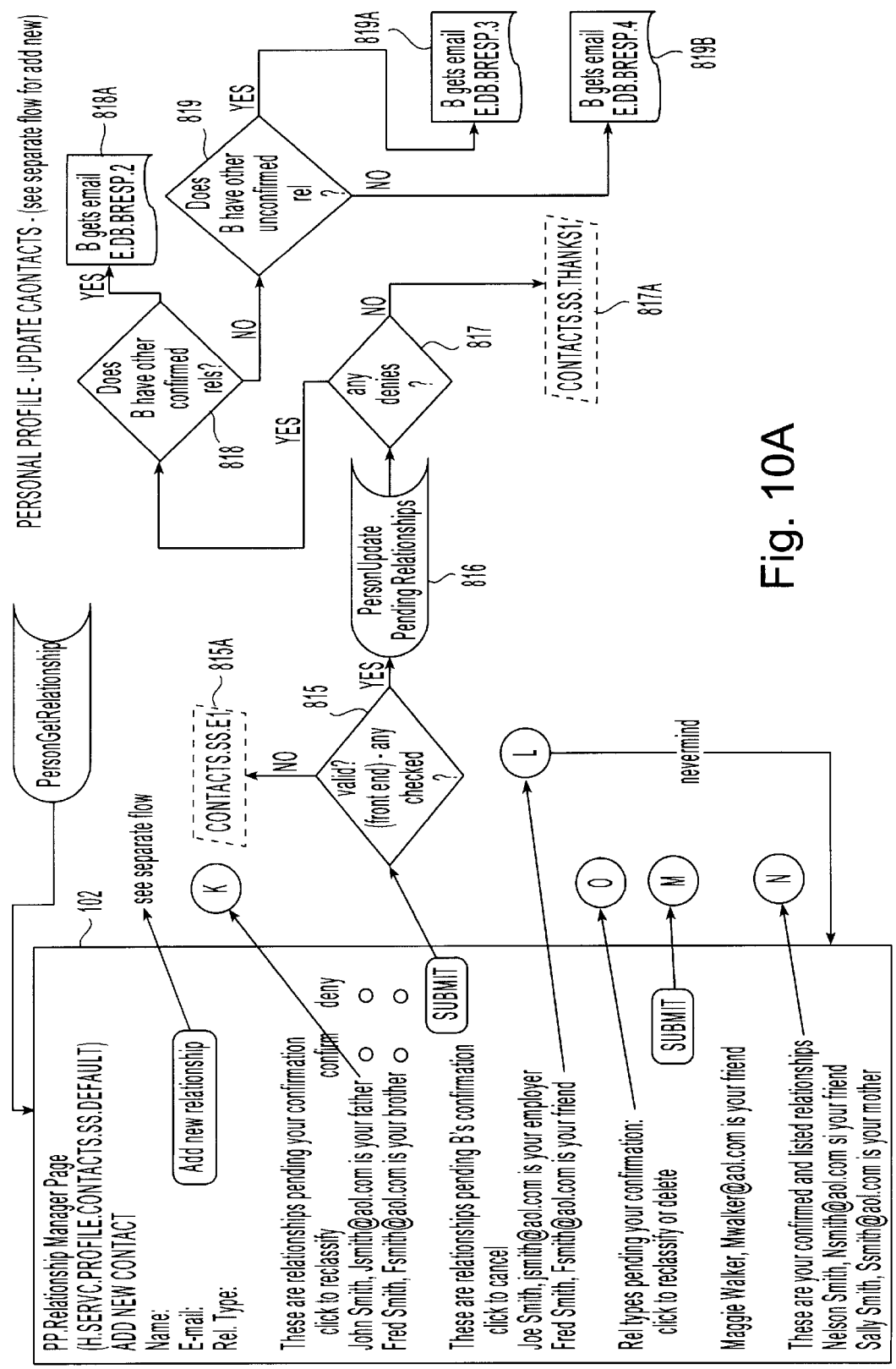
FIGS. 10A–10F are flow charts showing the process for editing the personal profile of FIG. 9.

Referring now to FIG. 10A, the logged-in user, in this case a USER1, may interactively confirm or deny a pending relationship. This is another function performed in the Personal Profile screen 102. This is initiated by the user clicking the appropriate confirm or deny check box, and then clicking on the "submit" button associated with the pending relationship. The submit box is simply a predetermined area which causes the information entered by the user to be input into DSP 12. More specifically, this causes, at step 1815, COLD FUSION 60 to determine whether any check box was selected. If an invalid click occurs, i.e., no check boxes were selected, step 1815A represents an error message screen to the user. Once a confirmation or denial is found at step 1815, a routine Person_Update_Pending_Relationships is executed at step 1816 which updates database 70 to any confirm or deny operations. At step 1817, COLD FUSION 60 determines whether any relationships to USER1 have a DENY. If not, step 1815A is executed and a message CONTACTS.SS.THANKS is displayed. If so, however, step 1818 is called wherein it is determined if any other relationships with a USER2 (whose relationship USER1 just denied) have a CONFIRM. If other relationships have a CONFIRM, a deny notification e-mail message E.DB.B-RESP.2 is sent to the USER2 at step 1818A, which explains that USER2 has other confirmed relationships. Otherwise, step 1819 is executed.

In step 819, database server 45 determines whether USER2 has any other relationships that have neither a CONFIRM nor DENY. If there are such other relationships, then step 1819A is executed and a deny notification e-mail message E.DB.BRESP.3 indicating other unconfirmed relationships exist, is transmitted to USER2. Otherwise, step 1819B is executed and a deny notification e-mail message E.DB.DRESP.4, indicating no other relationships (pending or confirmed) exist, is transmitted to the USER2.

3. Reclassify

Figure 10B:
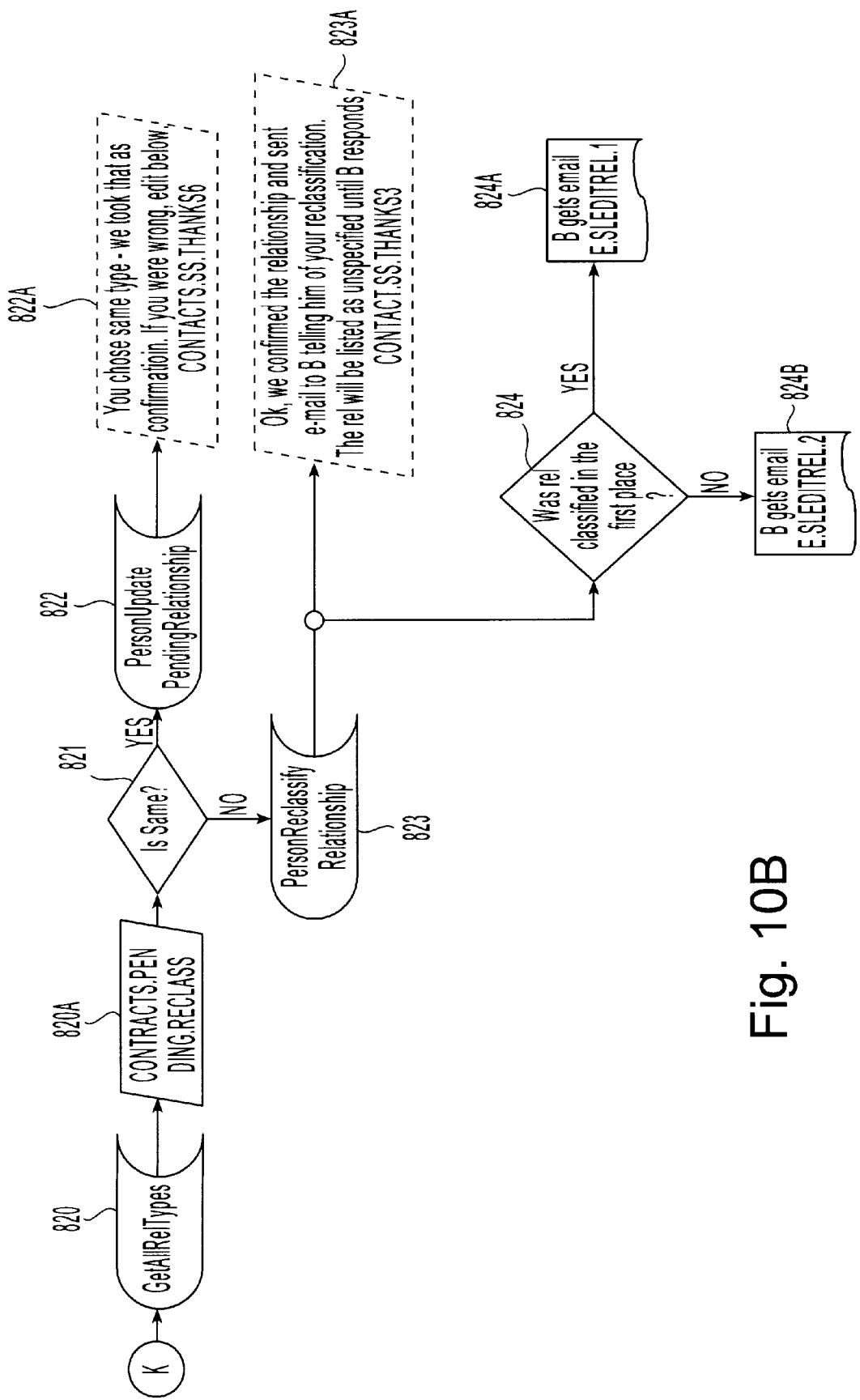
Figure 10C:
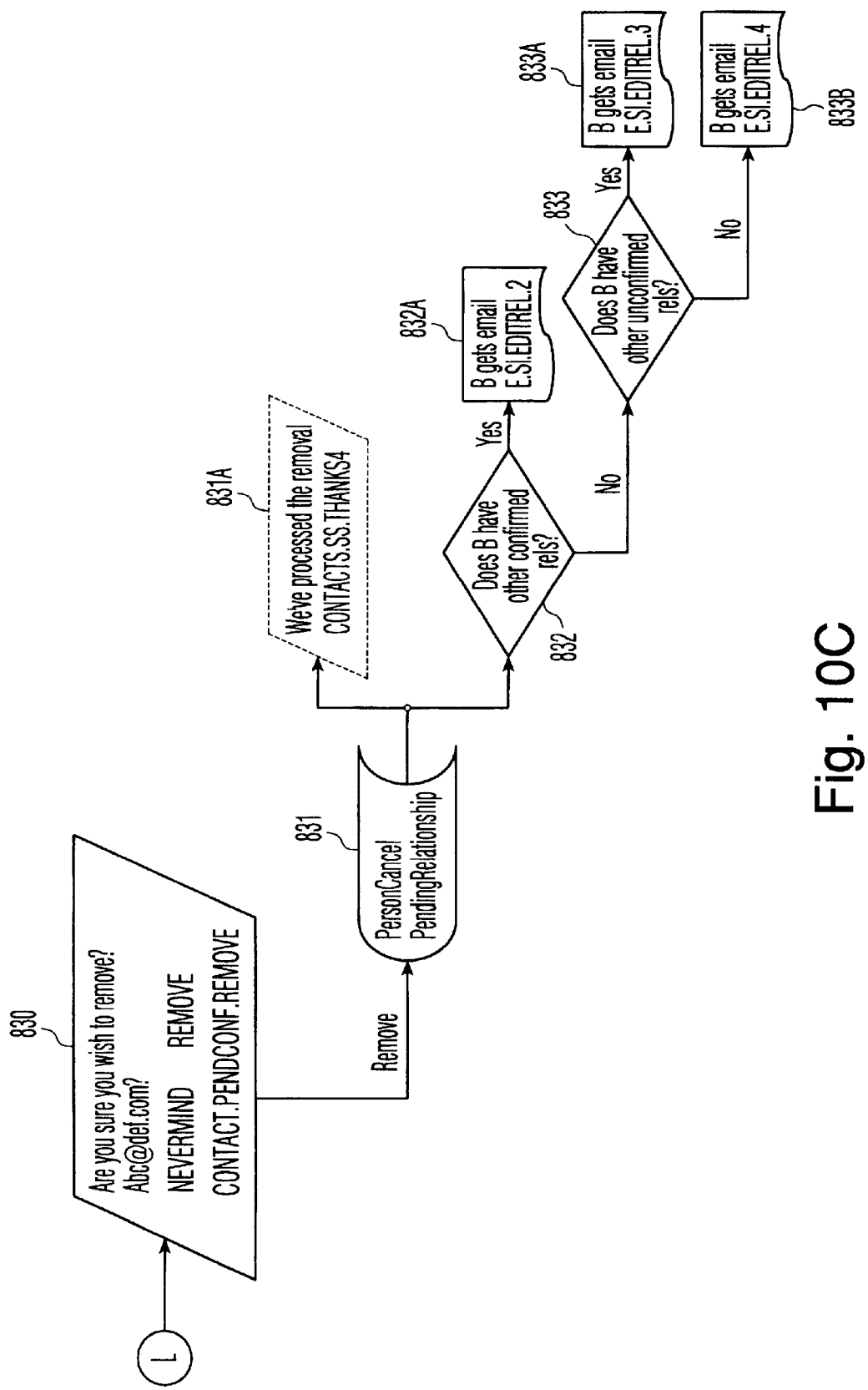

Referring to FIG. 10B, the logged-in user, in this case a USER1, also may reclassify a pending relationship by clicking on it in the Personal Profile screen 102. This causes COLD FUSION 60 to operate database server 45 to execute, at step 1820, the routine Get_All_Relationship_Types and a notification of the relationship at step 1820A. At step 1821 COLD FUSION 60 determines whether the proposed reclassification is the same as what was previously registered in database 70. If so, routine Person_Update_Pending_Relationships is executed at step 1822 confirming the relationship type. At step 1622A, a suitable message is displayed to the user indicating that the relationship type was confirmed. If not, however, routine Person_Reclassify_Relationship is executed at step 1823. Step 1823 signifies that USER1 has reclassified the relationship with USER2. At 1823A, a suitable message is displayed to the logged-in user. Also, at step 1824 the database server 45 queries whether the relationship was previously classified. If it was not, an e-mail message E.SI.EDITREL.2 is sent to USER2 at step 1824B indicating that a previously undefined relationship was classified. If it was classified, an e-mail message is sent to USER2 indicating that USER1 seeks to reclassify the relationship, at step 1824A.

4. Relationships Pending USER2'S Confirmation

One option a user has is to remove a proposed relationship that has not yet been confirmed or denied. When a user enters the "click to cancel" box on Personal Profile screen 102, shown in FIG. 10A, web server 35 displays a message requiring verification to remove a particular listing at step 830 (See FIG. 10C). If the user clicks on the "remove" box in the displayed message, the routine Person_Cancel_Pending_Relationships is called by database server 45 at step 831. This routine allows the user to remove unwanted relationships from his profile in DSP 12. It should be noted that the user has the option to return to screen 102 by clicking "nevermind" at step 830.

Step 831A is executed and the user receives back a message, CONTACTS.SS.THANKS4, confirming the removal. Subsequently, database server 45 executes steps 832–33. Steps 832 and 833 are similar to 1818 and 1819 above and will not be here discussed. It should be noted that the e-mail messages from steps 832A, 833A, and 833B are sent to the USER2 that was removed from the logged-in user's personal profile from parser 50.

5. Relationship Types Pending Confirmation

Figure 10D:
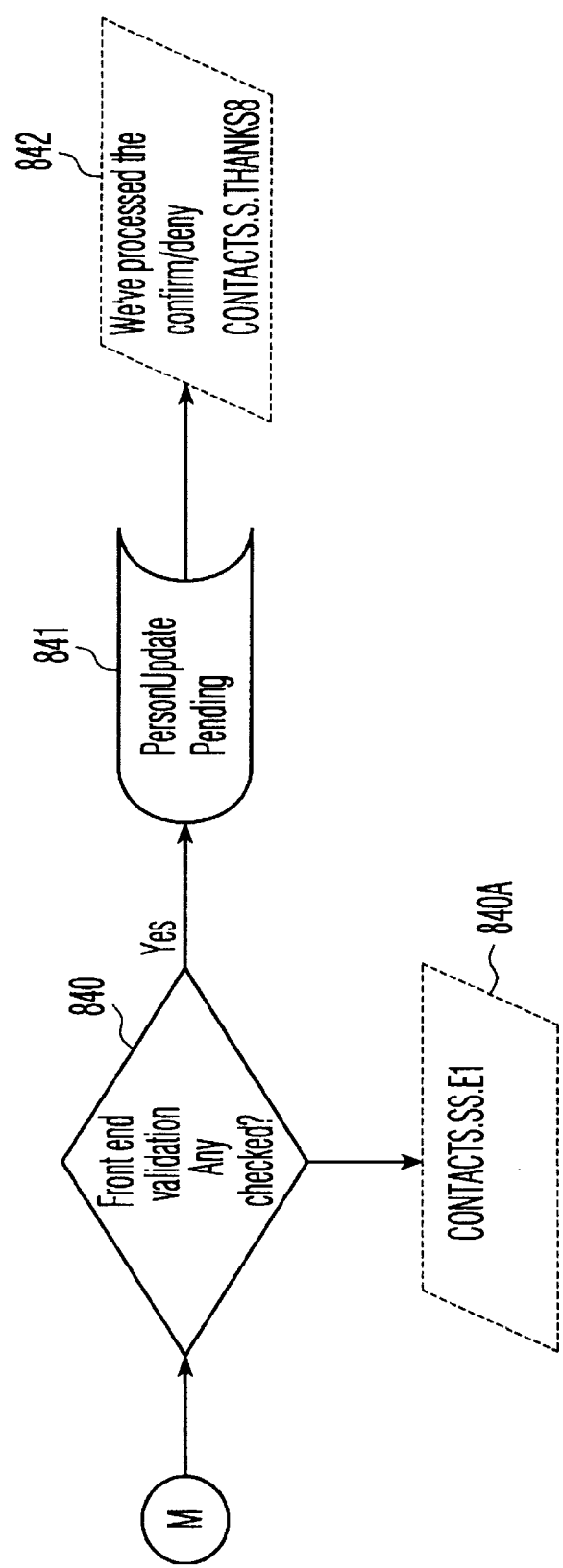

As shown in FIG. 10D, the user can confirm relationship type information by clicking on the appropriate box and then clicking on the "Submit" box. (Here, the relationships already have a confirmed state, but the relationship type has been reclassified by USER2). This causes COLD FUSION 60 to process the input data. At step 840, a validation is performed to determine whether any confirm boxes were "checked" by the user. If boxes were checked, then the routine Person_Update_Pending is called at step 841 by database server 45. If not, a display is shown of step 840A. In step 842, a screen is displayed thanking the user for updating his relationships.

6. Relationships Pending USER'S Confirmation

Figure 10E:
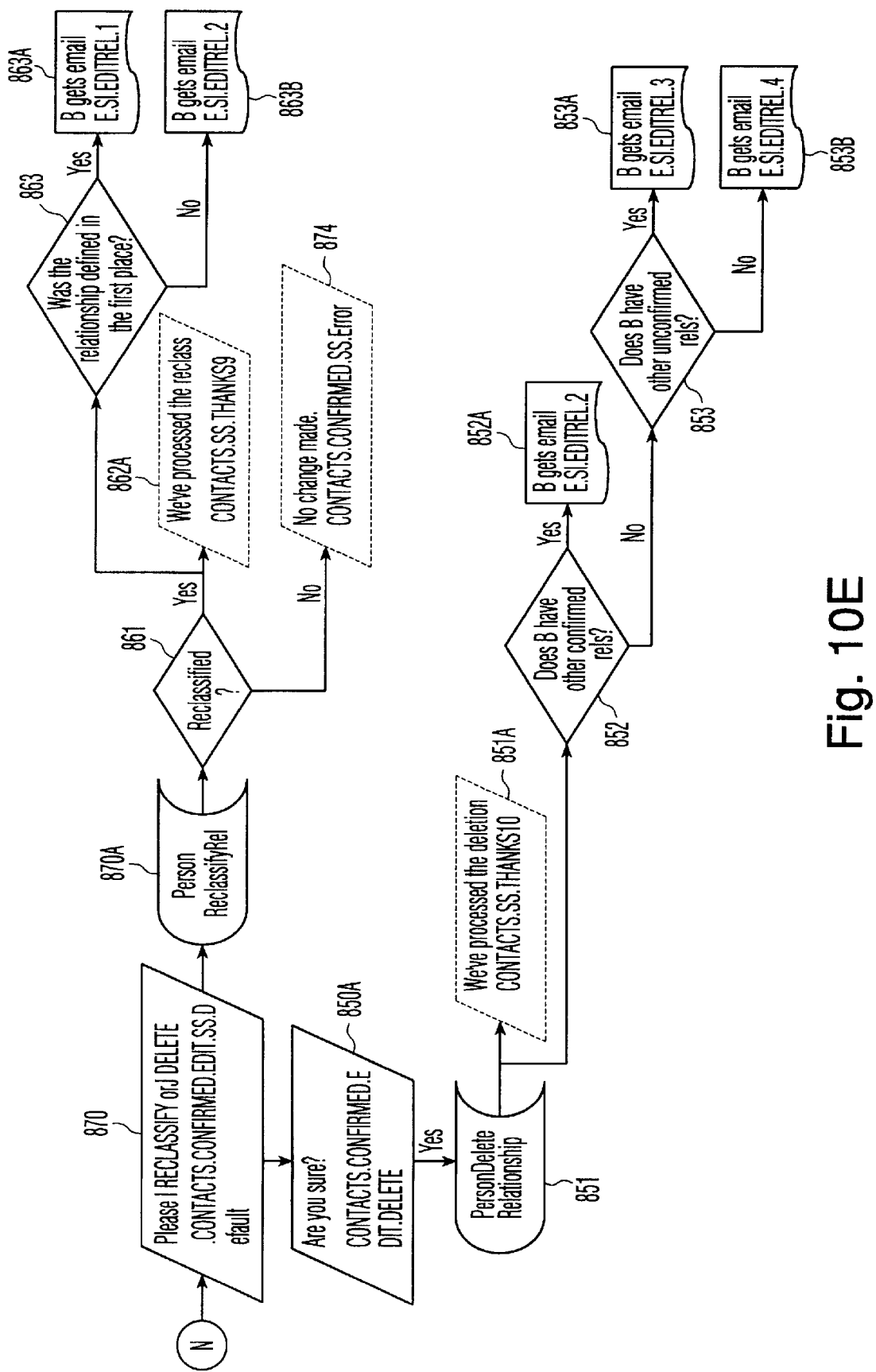
Figure 10F:
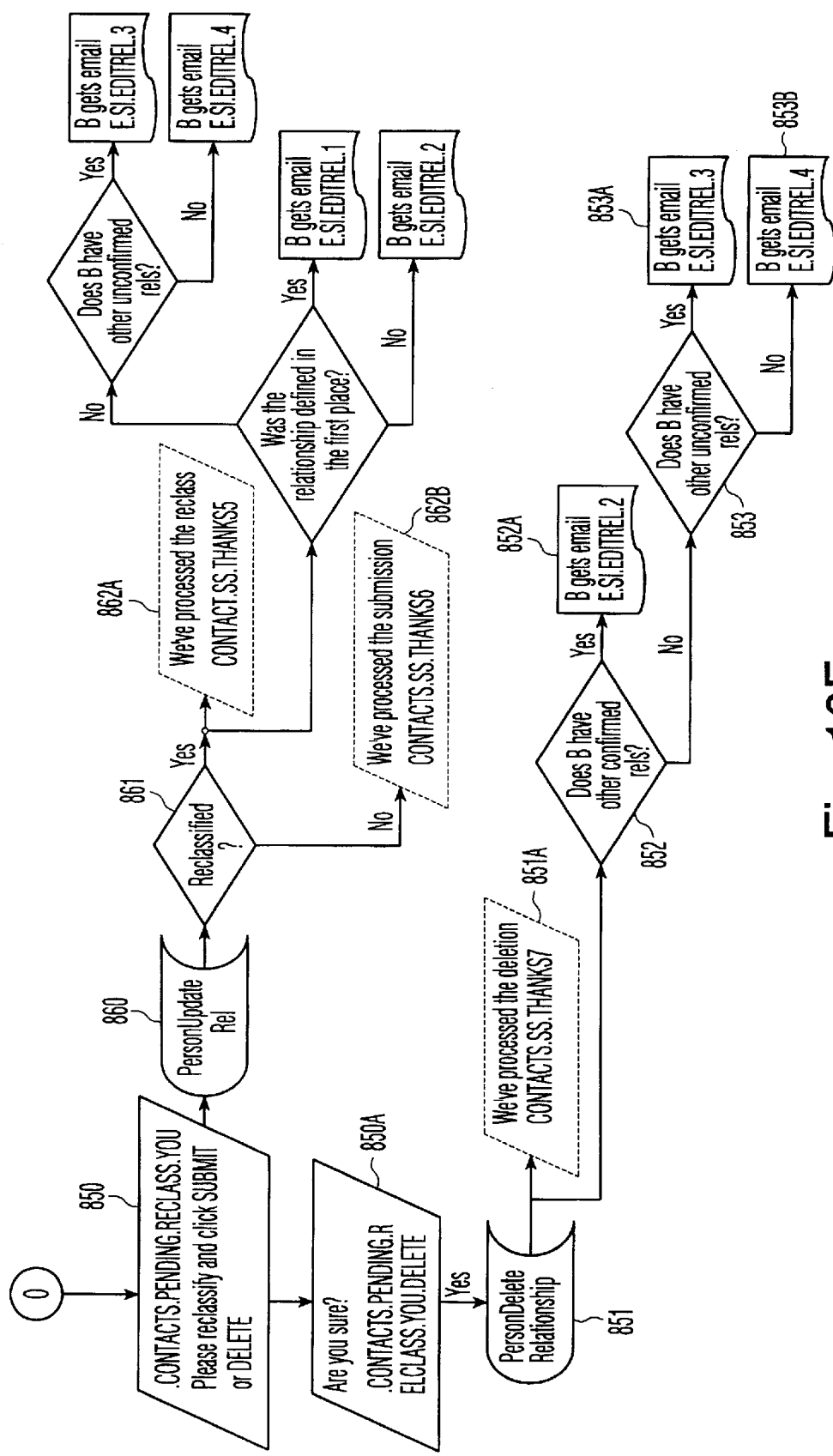

Referring to FIG. 10F, a user may click on the "click to reclassify or delete relationship types" button in screen 102 to reclassify or delete a relationship that is pending a confirmation of a relationship type. In response to a click, COLD FUSION 60 displays a message CONTACTS.PENDING.RECLAS.YOU to the user at step 850, asking the user either to click on delete, or to reclassify the relationship and click on submit to input the new type. If the user clicks on delete at step 850, a further screen prompt at step 850A is displayed to verify that the user is certain of the deletion. If the deletion is verified, at step 851, database server 45 calls routine Person_Delete_Relationship which displays a message CONTACTS.SS.THANKS7 confirming the deletion at step 851A. Steps 852, 852A, 853, 853A, and 853B are similar to steps 832, 832A, 833, 833A, and 833B respectively, as described above, and will not be further discussed here.

If, on the other hand, the user clicks on a "reclassify" box at step 850, database server 45 executes step 860. In step 860, Routine_Person_Update_Rel processes the request. At step 861, the database server 45 determines whether a reclassification was in fact performed. If not, step 862B is executed and a display is sent to the user indicating the relationship type was confirmed. On the other hand, if the type has been reclassified at step 861, an appropriate message is displayed (step 862A).

Following step 862A, step 863 is executed. Database server 45 determines whether the relationship was last defined by the USER2. If so, database server 45 executes step 863A to send an e-mail message E.SI.EDITREL.1 to USER2 to indicate the relationship has been reclassified. If not, then database server 45 executes step 863B to send an e-mail message E.SI.EDITREL.2 to USER2 to indicate the relationship has been reclassified from unspecified.

7. Confirmed Relationships

The user also may use screen 102 to delete or reclassify confirmed relationships in a similar manner.

Referring now to FIG. 10E, in step 870, the user is prompted to delete or reclassify any confirmed relationships. If delete is selected, steps 850A, 851, 851A, 852, 852A, 853, 853A and 853B are executed in a similar manner as described above (see FIG. 10F).

If reclassify is chosen at step 870, step 870A is executed in which database server 45 calls routine Person_Reclass_Rel as above. Then, steps 861–863B are executed as described above. (see FIG. 10F).

It should be understood that after each deletion or reclassification, the database 70 is suitably updated.

Editing Personal Profile

When a user registers with DSP 12 and becomes a member, the user may list various personal and professional information including e-mail address(es), last name, first name, aliases, occupation, geography, hobbies, skills or expertise, and the like. Certain user provided information, such as name, address, phone numbers, etc., may be consolidated in a "white pages" record of database 70. This information is all stored in one or more records in database 70 can be viewed through the personal profile functions when the user logs onto the web-site 90. One option a user has in using the personal profile is to edit any of the personal information previously provided by the logged-in user, as well as to provide new or supplemental information. This is done in a relatively straightforward manner and is generally described herein with reference to FIG. 11 and examples in FIGS. 12–13.

1. Editing Whit Pages

Figure 12:
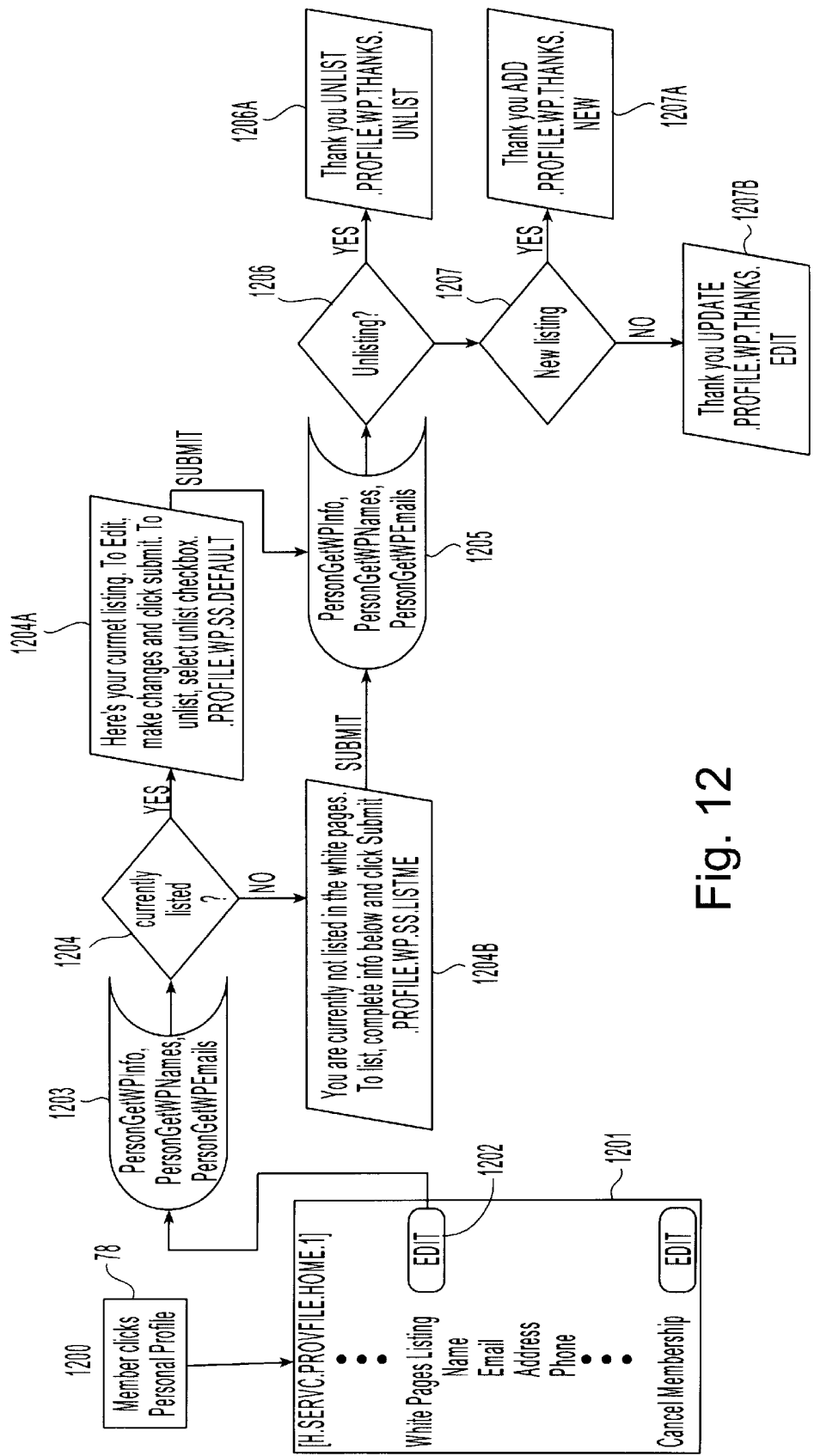
FIG. 12 is a functional flow diagram showing a method for editing the white pages using the screen of FIG. 11.

Referring now to FIG. 12, a flow chart is shown illustrating a process which allows a member to edit, add, or remove his personal profile listing from the white pages record in database 70.

In step 1200, the user clicks on "personal profile" box 78, on web-site 90, which executes step 1201. At step 1201, COLD FUSION 60 displays an edit screen 95 which allows the user to edit his personal profile. By selecting the "edit" box 1202A corresponding to the "White Pages Listing" at step 1202, the user begins the editing process. At step 1203, routines Person_Get_WP_Info, Person_Get_WP_Names, and Person_Get WP_E-mails are executed by COLD FUSION 60 and database server 45 to determine whether the member is currently listed in the white pages and to retrieve the user's relevant white page information at step 1204. If listed, step 1204A is executed and the current listing found in white pages is displayed at display device 23. At this stage, the user is prompted to input any new changes to his current listing or delete himself from the white pages. If the user is not listed, 1204B is executed which allows the user to input his personal and professional data.

After the user completes either steps 1204A or 1204B, routine Person_Update_WP_Info is called in step 1205. At step 1206, database server 45 determines whether the user has removed himself from the white pages. If the answer is yes, step 1206A is initiated and the data base server 45 removes the listing from the white pages. This generates a screen to the user confirming the change. If not, however, a query is performed at step 1207 to determine whether the information corresponds to a new listing. If yes, database server 45 updates database 70, and subsequently notifies the user at step 1207A. If not, step 1207B is executed and database server 45 updates changes to the current listing. Subsequently, the user is informed of the changes.

2. Cancel Membership

This routine allows the user to cancel or modify his membership status with DSP 12.

Figure 13:
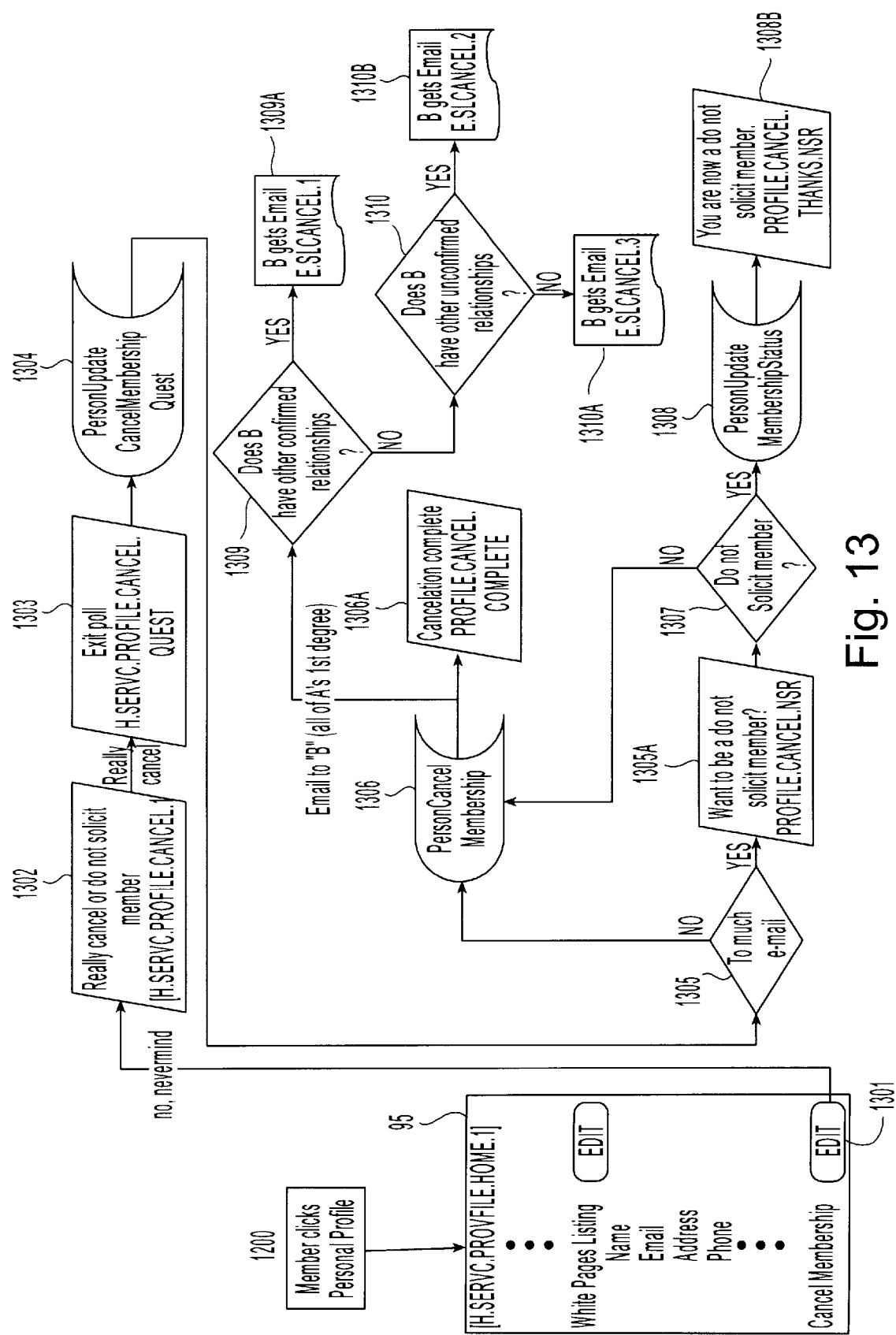
FIG. 13 is a flow chart illustrating a method for canceling a membership using the screen of FIGS. 9A–B.

Referring to FIG. 13, at step 1200 COLD FUSION 60 displays edit screen 95. By selecting the "edit" box 1301 corresponding to "Cancel Membership", the user executes step 1302. At step 1302, the user is queried as to whether she would like to proceed with the cancellation, change her status to "do not solicit", or both. This is followed by a sequence of steps that establishes, with confirmations as appropriate, the revised status of the user. The database is accordingly updated. In view of the detailed illustrations and the Microfiche Appendix, it is submitted that a person of ordinary skill in the art will be able to design appropriate sequences of instructions to edit the information of the personal profile of a user. The specific information and sequence is deemed to be a matter of design choice.

APPLICATIONS

One of the features of DSP 12 is that members can access various services to use the networking database for various purposes. One such purpose, which is an application of the networking database, is to search the database to find a member having a particular characteristic in his personal profile. Unlike conventional database searching, in accordance with the present invention, the networking database search also can provide a set of defined relationships between selected ones of hundreds or millions of thousands of members who respond to the search request. This permits the searching user to find a linkage of defined relationships between it and the member responsive to the search. It is estimated, based on the theories advanced by Marconi, that no more than six defined relationships will be needed to complete a chain between the searching user and the object of the search, assuming an adequately large number of members. The advantage of searching the networking database having defined relationships will become more clear in the view of the following examples.

EXAMPLE I

White Pages Search

Figure 14A:
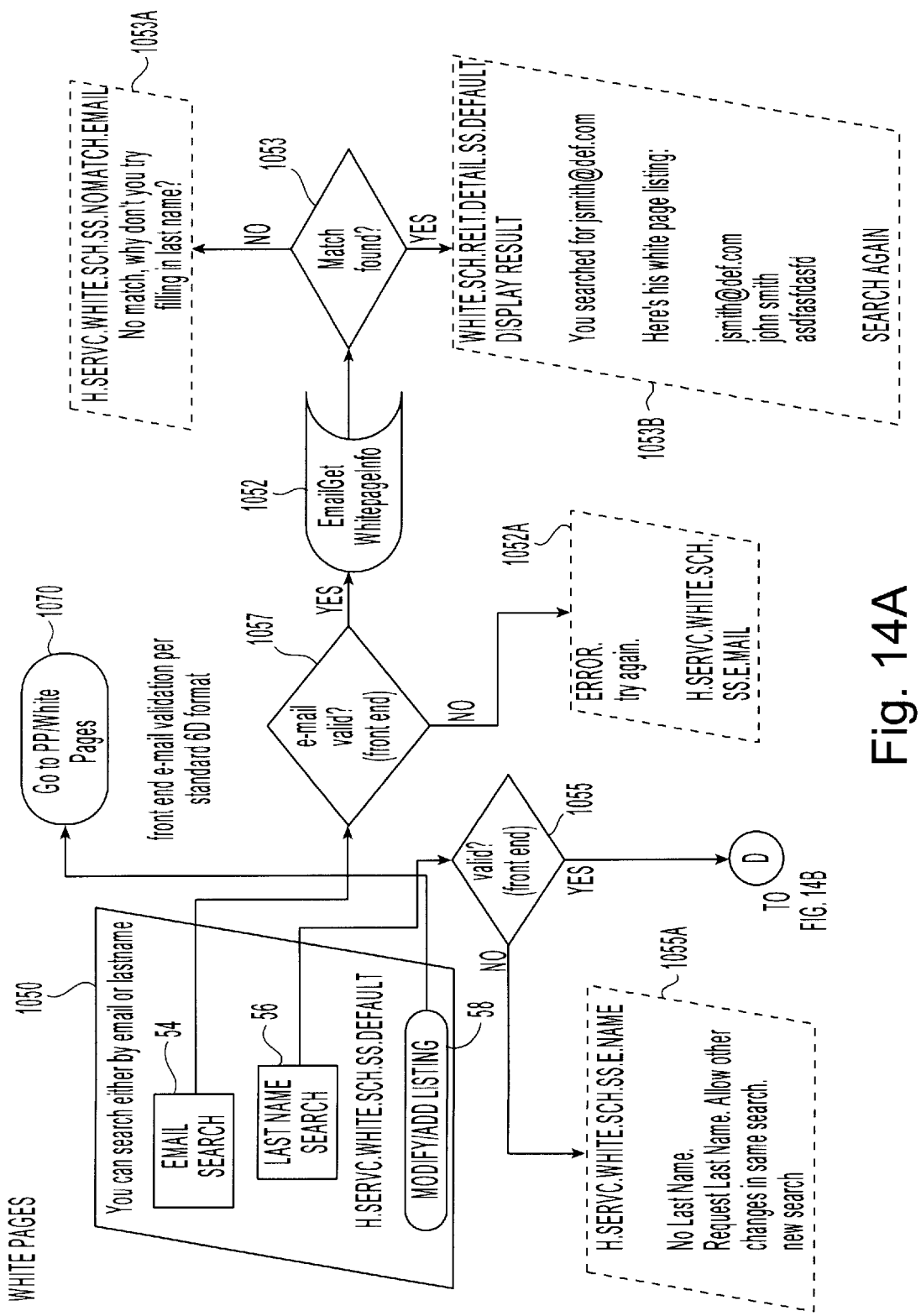
FIGS. 14A and 14B are flow charts showing a first application using the NDS of FIG. 1.
Figure 14B:
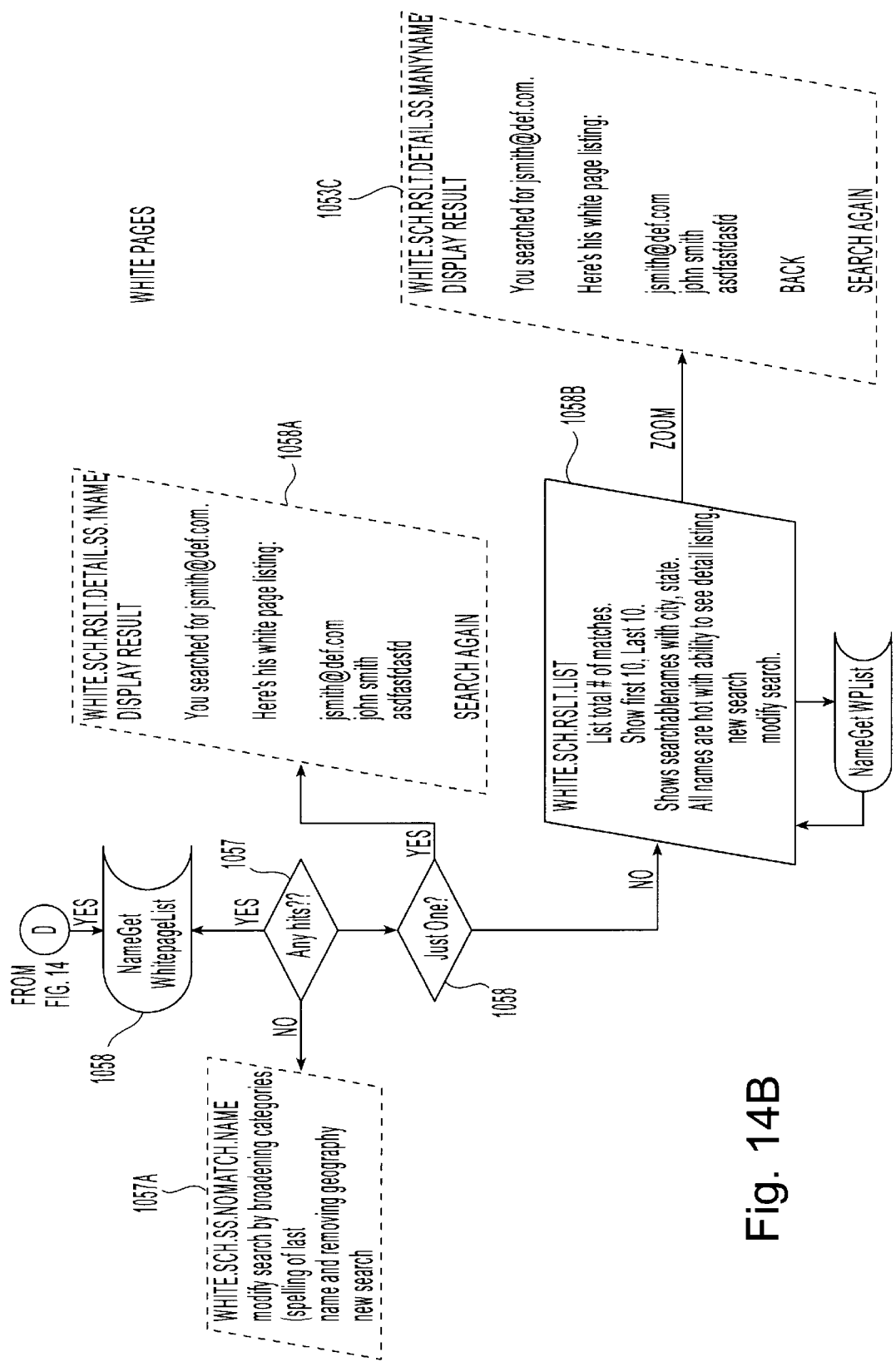

Referring to FIGS. 14A–B, an application of an embodiment of the present invention is shown in a flow chart which permits a member or a non-member user to search through the white pages listing.

At step 1050, the user is shown a display screen corresponding to the white pages search. At this point, the user does not have to have performed the LOGIN routine. However, it should be noted that, by design choice, only valid members are listed in the white pages directory of database 70 in the described embodiments. Other embodiments could permit non-members to be in the white pages. Still other embodiments could include having DSP 12 access available e-mail directories not part of the DSP 12.

The user may conduct a search using an e-mail address or last name. It is possible that other searches could be performed, e.g., occupation, geography, hobby, skills, etc., which could be listed in the white pages. With respect to a last name search in the preferred embodiment, the user only needs the first letter of the last name to retrieve results.

If at step 1050, box 54, "e-mail search", is selected by the user, step 1051 is executed to determine a valid e-mail entry as in step 602. If the entry is invalid, step 1051A is executed and the user is notified of the error and requested to try again. Otherwise, the database server 45 routine E-mail_Get_Whitepage_Info is called in step 1052 by COLD FUSION 60.

At step 1052, the database server 45 searches the database 70 in order to find the entered e-mail address. If found at step 1053, step 1053B is initiated and the result is displayed. The displayed result may list the first name, last name, street, city, state, zip code, country, home phone, work phone, or facsimile of the person searched. The white page listing parameters to be displayed may be chosen by the listed member at the time of registration or later. Further, it is possible that a member may permit certain of the white page information to be displayed to non-members, which is less than what is displayed to valid members. Also, what is displayed can be changed, as the member desires.

Referring again to step 1053, if no matches are found, step 1053A is executed, notifying the user that no match was obtained.

It should be noted that in each of step 1053A and 1053B, the user is able to begin a new search.

Referring back to step 1050, if the user chooses box 56, "last name search", step 1055 is executed to determine whether the entered last name is valid.

If invalid, step 1055A is called to notify the user of this result. If valid, however, routine Name_Get_whitepage_List is called in step 1056. At step 1057, the number of search results is determined. If none, step 1057A is performed by COLD FUSION 60, indicating that no results were found, and also allowing a new search to be conducted, for example, by broadening the search categories.

If matches are found in step 1057, the number of matches is counted in step 1058. , Next, routine Name_Get_WP_List is called. In step 1058B, the total number of matches and all or a part of the search results are shown. The number of results shown may be any number, but is preferably ten. The user may display the profile of any person on the list of results by clicking on the displayed name which brings up screen 1053C. This is done in a manner that is well known. Similar to steps 1053A–B, a new or modified search may be selected at steps 1057A, 1058B and 1058C.

Again at step 1050, if the user selects box 58, "modify/add listing", step 1070 is executed. Here, the user, after completing LOGIN (if not already logged in), may modify or add his listing to the white pages.

At step 1070, COLD FUSION 60 transfers the user to the personal profile to edit the information in the white page listing. (See FIG. 12).

EXAMPLE II

Network Me

Figure 15:
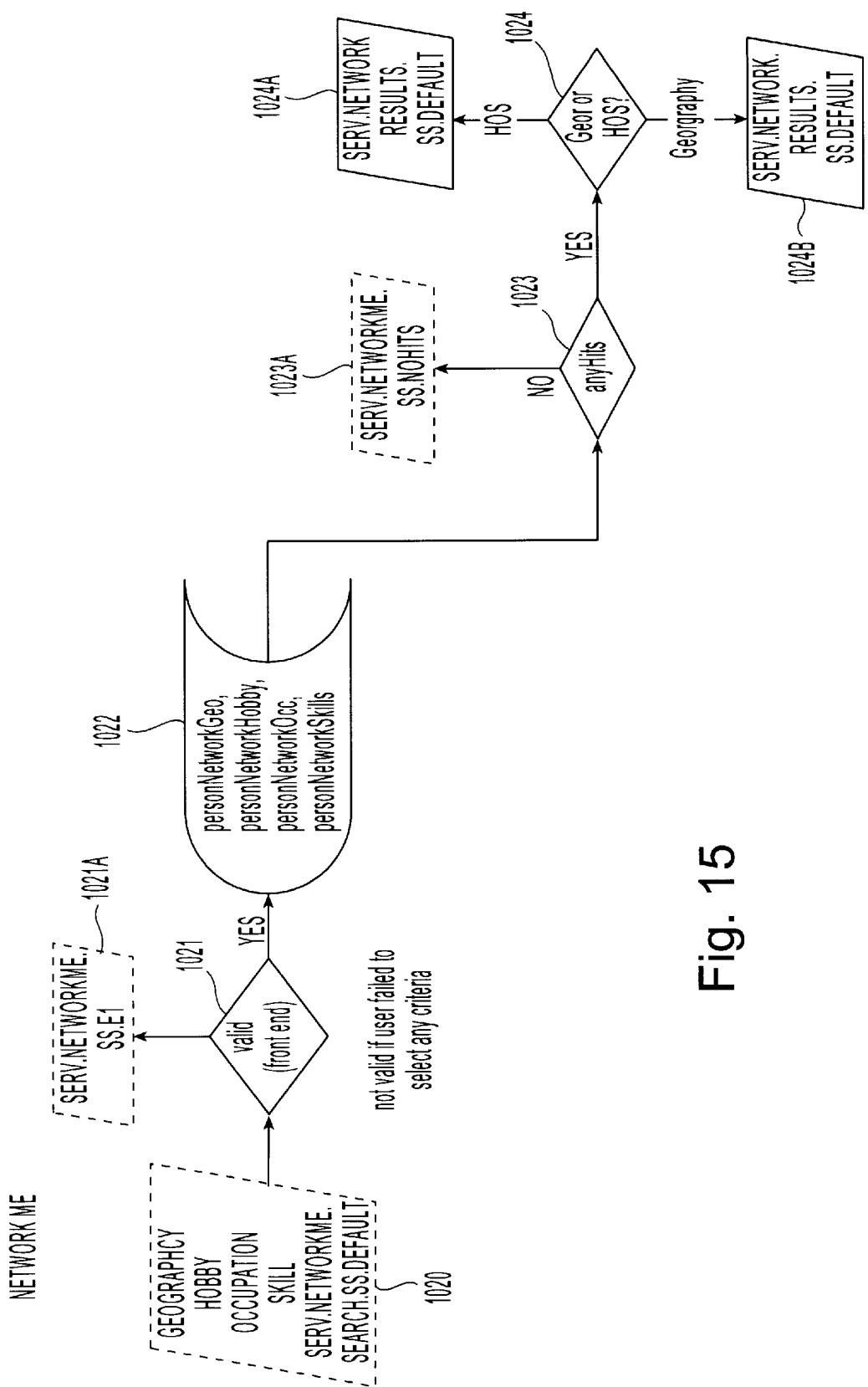
FIG. 15 is a functional flow diagram showing a second application using the NDS of FIG. 1.

Referring to FIG. 15, another preferred embodiment using DSP 12 of the present invention is illustrated which allows a member to search for other members that he is connected to directly or indirectly by defined relationships confirmed to be valid, based on one or more of the criteria entered in the member's personal profile (see FIG. 11). For example, selected criteria may include, among other variations, one of (i) geography; (ii) occupation and geography; (iii) hobby and geography, and (iv) skill and geography. It should be noted that the criteria may be general or more specific. For example, for geographical information, the user may specify the state or, more specifically, the city of the person to be searched. It is also possible the criteria could include organizations such as alumni clubs or place of employment.

Referring now to FIG. 15, the user may click on box 42, "network me", in what is now a conventional manner. The user may access box 42 by first completing LOGIN or alternatively checking box 42 and then completing LOGIN. It should be apparent that, by design choice, only members are authorized to utilize the "connect me" process. A similar procedure can be used at the start of each application, e.g., network me. It also should be noted that the user could already be logged in when seeking to access this application. Thus, there is no need to login again. COLD FUSION 60 prompts the user at step 1020 to enter the criteria to be searched. The parameters to be entered are dependent on the type of search being performed, as described above. If the user fails to select the proper criteria for the search at step 1021, the routine will typically prompt the user to re-enter the correct search criteria. If, for example, the user intends to perform an occupation and geography search and only enters data representative of geographical preference, then, step 1021A is executed notifying the user of the deficiency. If all of the proper search criteria are entered at step 1021, step 1022 is called. It should be noted that, by design choice, if a user chooses at step 1020 a search using any of hobby, occupation or skill, and only enters geographic information, a geographic search will be performed. Additional information on the search may be obtained in addition to the geographic information.

In step 1022, one of routines Person__Network__Geography (geographic), Person__Network__Hobby (hobby), Person__Network__Occupation (occupation), and Person__Network__Skills (skills), is called corresponding to the desired search to be performed. Each of the search routines is in SQL and is well known in the art. Therefore, they will not be further discussed. In step 1023, COLD FUSION 60 and database server 45 determine if any search results corresponding to the inputted criteria are found in database 70. If not, step 1023A is called to notify the user. Otherwise, step 1024 is executed to determine whether the search was by geography only or by geography and other criteria. If by geography only, the display at step 1024B is shown. Otherwise, the display at step 1024A is shown.

Alternatively, instead of listing members by e-mail address, last name etc., it should be recognized that a "marketplace" could be designed which allows users to list products and services for sale, hire, rent etc., and to be searched by product type, services, etc. The marketplace could be limited to direct or indirect relationships.

EXAMPLE III

Connect Me

Figure 16A:
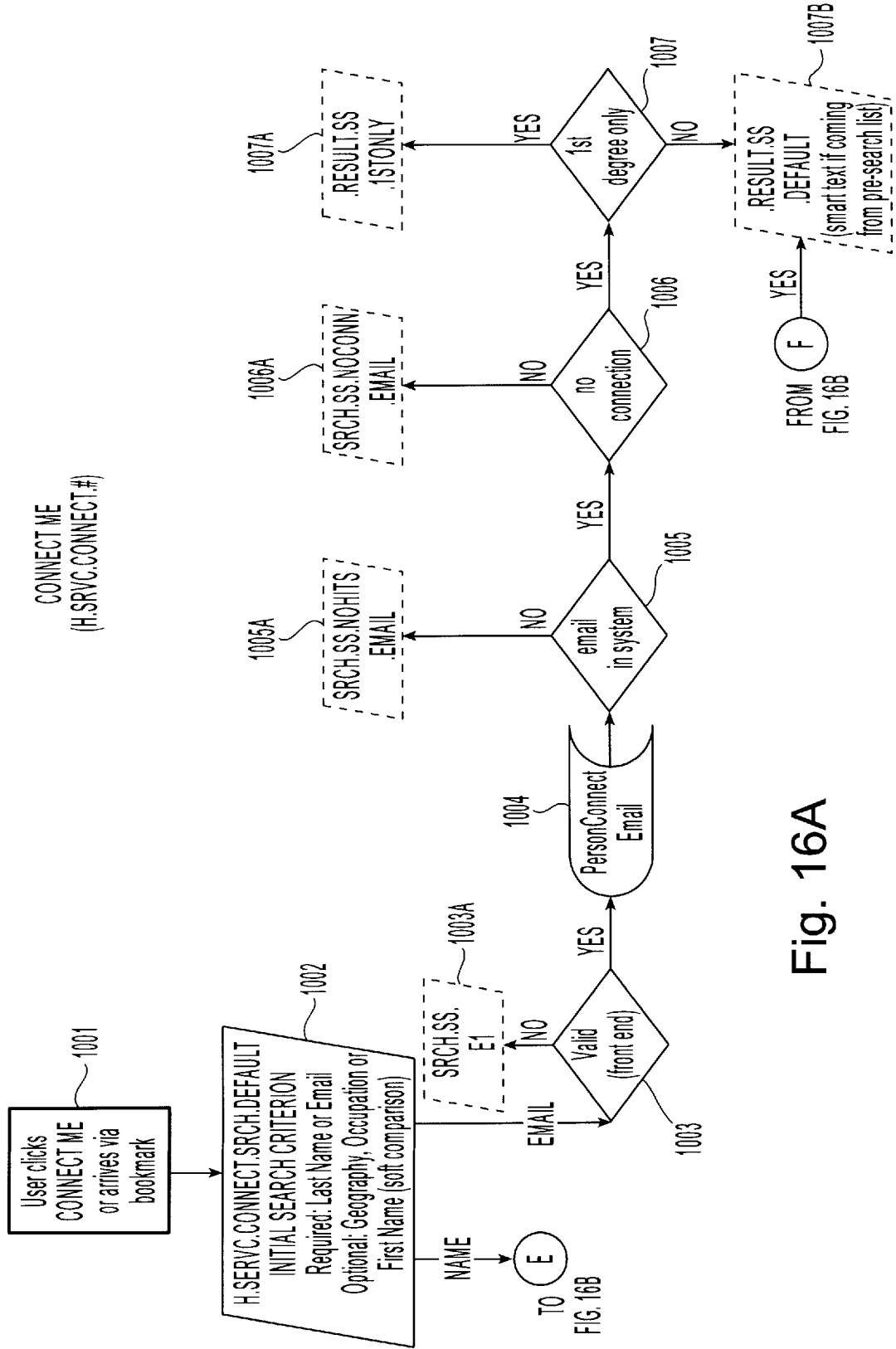
FIGS. 16A–16B are flow charts illustrating a third application using the NDS of FIG. 1.
Figure 16B:
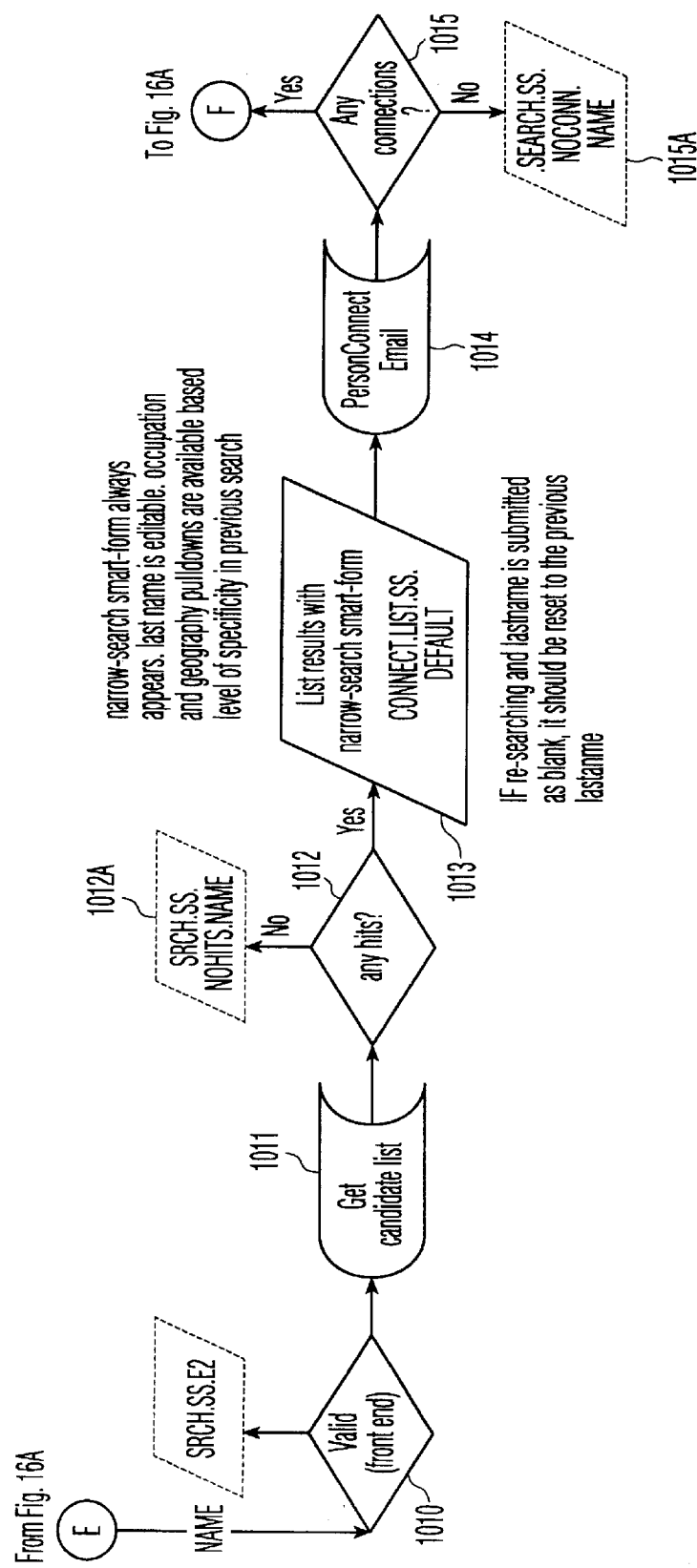

Referring to FIGS. 16A–16B, another illustrative embodiment using the DSP 12 of the present invention is shown.

In step 1001, the user clicks on box 39 corresponding to "connect me." The user may access box 39 by first completing LOGIN or alternatively checking box 39 and then completing LOGIN. It should be apparent that, by design choice, only members are authorized to utilize the "connect me" process. A similar procedure can be used at the start of each application, e.g., network me. It also should be noted that the user could already be logged in when seeking to access this application. Thus, there is no need to login again.

At step 1002, a search screen is displayed, on display 23, which interrogates the user for the last name or e-mail address of the person the user wishes to search. However, the user may also provide geographical or occupational data, or the first name of the person. Other embodiments are also possible such as searches by hobbies, skills, etc. It is to be understood that, in the preferred embodiment, only an e-mail address or a last name is required at step 1002.

If at step 1002, an e-mail address is entered, step 1003 is executed to determine a valid e-mail address such as in step 602. If a valid address is not found, step 1003A is executed and a suitable display, SRCH.SS.E1, is sent to the user.

If, however, the e-mail address is valid, routine Person__Connect_E-mail is called by COLD FUSION 60 at step 1004. At step 1005, a determination is made as to whether the entered e-mail address is listed in database 70. If the e-mail address is not found in database 70, step 1005A is executed notifying the user that the e-mail address is unknown. If the output of 1005 is yes, then step 1006 is called to determine whether a connection has been found between the user and the search criteria, e.g., geography, occupation, etc. If not, then step 1006A is executed informing the user. If, however, a connection is found, then step 1007 is called to determine whether the connection in step 1006 is only a "first degree" relationship. A first degree relationship is one wherein a user has a confirmed relationship with another user in the database 70 (or by the other user listing him in the database 70). A "second degree" relationship is when the connection includes a first degree relationship, as between USER1 and USER2, and a separate defined relationship as between USER2 and USER3, and the connection is made between USER1 and USER3 by the chain of two linked defined relationships. Thus, an N degree relationship is a chain of N linked first degree relationships. It is to be understood that DSP 12 could monitor the number of relationships by degree number (first degree, second degree etc.) and notify the user, for example, via e-mail how his relationships have compiled over a period of time.

If yes in step 1007, step 1007A is called to show the user the detail of the connection, for example, the first name, last name and how the user is connected to the person found in the search. If not, then 1007B is executed notifying the user.

Referring again to step 1002, if the input is a last name, step 1010 is executed.

In step 1010, the last name is determined to be valid and listed in database 70. If not, step 1010A is called and SRCH.SS.E2 is displayed to the user. If, on the other hand, the name is valid, routine Get__Candidate is called in step 1011 by COLD FUSION 60.

At step 1012, the number of search results is determined. If none are found, step 1012A is executed so informing the user. Otherwise, step 1013 is called to display a list of matching entries to the user.

In step 1014, Person__Connect is initiated to determine whether any connections were found to the name on the result list that is selected. If yes, step 1007 is executed. If not, however, step 1015A is executed, indicating to the user that no connection was found.

Requesting a New Password

The function of subroutine Person__Resend__Password is to allow a member of DSP 12 to request a new password in the event his original password is lost, misplaced, or forgotten. A password may only be sent to the user's primary e-mail address and is a randomly generated password—not selected by the user—different from the original password. The first time the user attempts to use one of the original or current password, the password not used is invalidated.

Figure 17:
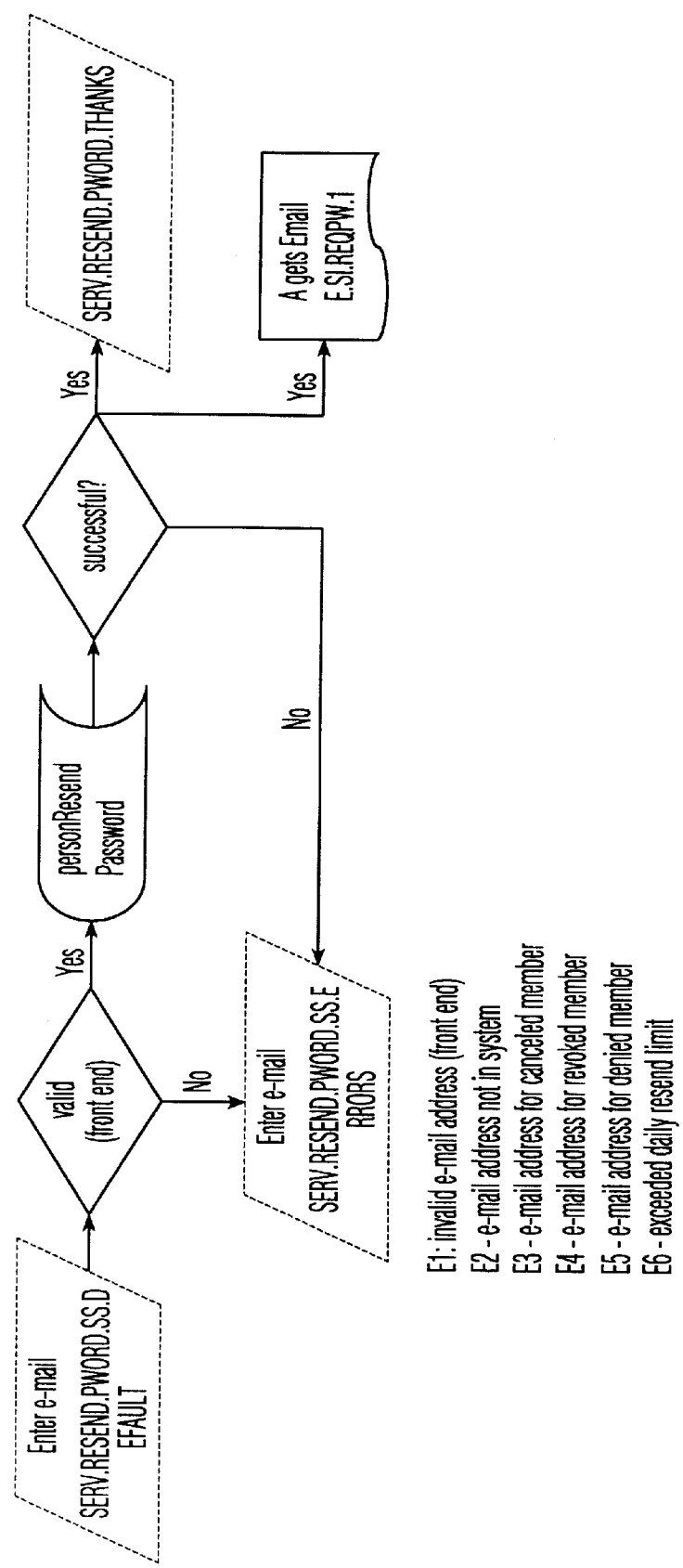
FIG. 17 is a flow chart showing a fourth application using the NDS of FIG. 1.

Referring now to FIG. 17, a flow chart illustrating Person__Resend__Password is shown. At step 475, COLD FUSION 60 delivers a screen to display 23 prompting the user to enter his e-mail address. If the address is determined to be valid at step 476, i.e., it is in a proper format (see step 602), routine Person__Resend__Password is executed at step 477. Otherwise, the user is notified that the e-mail address entered is invalid at step 478A.

In steps 477 and 478, routine Person__Resend__Password determines whether an e-mail address is successful, that is, the e-mail address is in system. If the output of step 478 is found to be successful, the user is sent notification of the success at step 479B. In step 479B, database server 45 generates a new password, updates database 70, and passes the new password to mail server 55 to send to the user at his primary e-mail address. The user is notified at step 479A. It should be understood that a user can only receive a new password by accessing his private e-mail. Therefore, only the user has access to the new password, thereby maintaining the confidentiality of the password for the user In step 478, if the output is unsuccessful, step 478A is again executed. However, in this case, the e-mail address in steps 477–78 could be determined as follows:

(i) e-mail address is not listed in database 70;

(ii) e-mail address is assigned to a canceled member;

(iii) e-mail address is assigned to a revoked member;

(iv) e-mail address is assigned to a denied member; and (v) the maximum number of requests by the user to access routine Person_Resend Password has been exceeded. If this is the case, the user is informed accordingly. If the maximum number of requests is exceeded, the user may not request that the password be resent for a certain period of time.

Session Validation

The communications protocol, http, used to carry information between the user and DSP 12, as discussed above, is "connectionless". In other words, the identity of the user does not persist as the user navigates from one screen to the next. As such, authentication cannot be implemented as it is with conventional client/server applications, wherein the user logs-in to the server once during a session and remains validated in the system until he logs-off. Accordingly, the present invention, in a preferred embodiment, uses a subsystem which uses routine, Session_Validation whereby, upon verification of username and password (see LOGIN), a unique Session Identification (SID) is established for the user which is stored in a data table of DSP 12. (See steps 701–703; FIG. 4A). This SID is passed by DSP 12 to the user after each transaction with DSP 12, such that the user maintains his SID for each subsequent communication with DSP 12.

In addition to the SID, the user also transmits his network address and browser type (See FIG. 1), which the DSP 12 compares with the SID. In cases wherein: (i) the SID is not found, (ii) the network address has changed, (iii) the browser type is altered, or (iv) the session has been inactive for an excessive amount of time, the request for LOGIN is considered invalid, and the user is required to LOGIN again. (See step 702; FIG. 4A).

It is to be understood that the routines herein discussed, in accordance with the process of the present invention, are explained in further detail in the attached Microfiche Appendix. As herein described, the routines are referred to on a system level using a standard format as is conventional in the art: such as Person_Resend_Password (See FIGS. 16A–16B) or Person_Get_Rel (see FIGS. 4A–4C). It also should be understood that persons of ordinary skill in the art could, in view of the disclosure herein, produce suitable software that is fundamentally different in form from what is disclosed in the Microfiche Appendix, yet perform the indicated and desired functions as set forth herein. Further, although the invention has been described with reference to a particular embodiment, it is to be understood that this embodiment is merely illustrative of the application of the principles of the invention and should not be construed in a limiting manner. Numerous other modifications may be made and other arrangements may be devised without departing from the spirit and scope of the present invention.

We claim:

1. A networking database system comprising:

a communication port;

a web server connected to the communication port;

a database containing a plurality of records;

a database server connected to the database for operating on said database;

a database connectivity engine connected to the web server for preprocessing the output of the web server and connected to the database server;

a queue watcher coupled to said database server for queuing outgoing e-mails;

a mail server operatively connected to the communication port to receive incoming e-mails, and connected to said queue watcher to transmit outgoing e-mail; and a parser connected to the mail server to process incoming e-mails and connected to the database server;

wherein the database server is responsive to the parser processing to manipulate a record in the database, and selected ones of said plurality of records are linked to selected other ones of said plurality of records by a confirmed defined relationship or a denied defined relationship.

2. The system of claim 1 wherein a first incoming e-mail contains a formcode and the parser is operable to identify the formcode, wherein the database server responds to the identified formcode to update or generate records in said database.

3. The system of claim 1 further comprising a network coupled to said web server at said communication port operable to connect a first user to said web server.

4. The system of claim 3 wherein the network supports communications of said incoming and outgoing e-mails.

5. The system of claim 3 wherein said first incoming e-mail is associated with a first user and a first outgoing e-mail is associated with a second user and wherein the first incoming e-mail and first outgoing e-mail further comprise information regarding a first relationship between said first user and said second user.

6. The system of claim 5 wherein said plurality of records further comprises a first record and a second record corresponding to said first and second users, respectively, and wherein said database server operates on said first and second records to update said first relationship between said first record and said second record to one of a confirmed defined relationship and a denied defined relationship.

7. The system of claim 6 further comprising a third user on said network, wherein said database server updates said second record in response to an incoming e-mail and a formcode in an e-mail from said third user.

8. The system of claim 6 further comprising a third user on said network, wherein said database server updates said second record in response to an input from said third user at said communication port.

9. The system of claim 6 wherein each of said plurality of records further includes a security code.

10. The system of claim 9 further comprising an input corresponding to said second user, the input being a function of said security code, and wherein said input contains data corresponding to said second user.

11. The system of claim 10 further comprising a third user on said network, wherein said input further comprises a second relationship between said second user and said third user and the database server is operable to transmit a second outgoing e-mail to said third user.

12. The system of claim 11 wherein said plurality of records further comprises a third record corresponding to said third user, and wherein said second relationship is one of a confirmed defined relationship or a denied defined relationship and wherein said database stores said second relationship in said second and third records.

13. The system of claim 1 wherein said plurality of records further comprise at least one of the group consisting of demographic data and relationship data.

14. The system of claim 1 wherein said plurality of records further comprise a personal profile component wherein said personal profile component is modifiable by a user.

15. A method for creating a networking database system having a communication port and a database for storing data in a plurality of records comprising:
   (a) receiving a first input at said communication port containing a first set of data corresponding to a first user, said first set of data including a relationship between said first user and a second user;
   (b) storing the first set of data in a first record of said database;
   (c) determining a first relationship between a first user and a second user from said first set of data;
   (d) transmitting a first e-mail to said second user, the first e-mail containing information that is a function of at least said first relationship;
   (e) creating a second record in said database corresponding to said second user; and
   (f) receiving a second input at said communication port from said second user in response to said first e-mail, wherein said second input contains status information corresponding to said first relationship.

16. The method of claim 15 wherein step (b) further comprises updating the first record in response to said second input and step (f) further comprises storing said status in said first and second records.

17. The method of claim 15 wherein step (f) further comprises receiving said status information as one of a confirmed relationship, a denied relationship and non-responsive input.

18. The method of claim 15 wherein step (f) further comprises receiving an e-mail from said second user.

19. The method of claim 18 further comprising receiving a third input at said communication port containing a second set of data corresponding to said second user, said second set of data including a second relationship between said second user and a third user, and storing said second set of data in said second record of the database.

20. The method of claim 19 further comprising determining a second relationship between said second user and a third user from said second set of data.

21. The method of claim 20 further comprising transmitting a second e-mail to said third user, the third e-mail containing information that is a function of said second relationship.

22. The method of claim 21 further comprising establishing a third record in said database corresponding to the third user, said third record including said second relationship.

23. The method of claim 15 wherein step (d) further comprises generating a security code corresponding to said second user, and transmitting said security code in said first e-mail.

24. The method of claim 23 wherein said second input is a function of said security code and said method further comprises receiving a third input at said communication port.

25. A networking database apparatus comprising;
means for communicating on a network having a communications port for receiving an input of data and transmitting an outgoing e-mail;
means for storing a first record and a second record in a database in response to a first data input from a first user, said first data input including information about a relationship between said first user and a second user, wherein said first and second records correspond to the first user and the second user, respectively;
means for transmitting a first e-mail to said second user in response to said determined relationship, the first e-mail being a function of said first relationship; and
means for receiving a second data input from said second user in response to said first e-mail, wherein said second data input comprises status information about said first relationship.

26. The apparatus of claim 25 further comprising means for updating said status information in said first and second records in response to said second data input from the second user wherein said status information is one of a confirmed relationship and a denied relationship.

27. The apparatus of claim 26 wherein the second data input further comprises an e-mail from said second user.

28. The apparatus of claim 26 further comprising a web site and wherein said second data input comprises data entered at the web site by the second user.

29. The apparatus of claim 25 further comprising means for generating a security code associated with said second user, wherein said first e-mail further includes the security code.

30. The apparatus of claim 29 further comprising means for updating said second record in response to said second data input from said second user, said second data input being a function of said security code.

31. The apparatus of claim 30 wherein said second data input further comprises information about a second relationship between said second user and a third user, and further comprising means for transmitting a second e-mail to said third user in response to said second data input.

32. A method for creating a networking database system comprising the steps of:
receiving from a first individual a first set of data relating to said first individual, said first set of data including at least one name and address of a second individual and a relationship between said first individual and the second individual,
storing the first set of data in a first record of said database;
transmitting a first message to said second individual at said address, said first message inviting the second individual to join the database by providing a second set of data relating to said second individual, said second set of data including at least one name and address of a third individual and including a relationship between said second individual and the third individual;
receiving from the second individual the second set of data; and
storing the second set of data in a second record of said database,
whereby, by repeated iterations of the steps of receiving data from one individual that provides information about that individual and provides the name, address and a relationship with another individual, transmitting a message to said another individual and inviting said another individual to submit information about himself or herself and the name, address and a relationship with still another individual, a database is established specifying information about the individuals and their relationships.

33. The method of claim 32 further comprising the step of inviting the second individual to confirm the relationship between the first individual and the second individual that is described by the first individual.

34. The method of claim 33 further comprising the step of confirming the relationship between the first individual and the second individual.

35. The method of claim 32 wherein the address of the second individual is an e-mail address and the first message is an e-mail.

36. The method of claim 32 wherein each individual is identified by a name and an e-mail address and messages to the individuals are e-mail messages.

* * * * *